US009489180B1

United States Patent
Baskaran et al.

(10) Patent No.: US 9,489,180 B1
(45) Date of Patent: Nov. 8, 2016

(54) METHODS AND APPARATUS FOR JOINT SCHEDULING AND LAYOUT OPTIMIZATION TO ENABLE MULTI-LEVEL VECTORIZATION

(71) Applicant: Reservoir Labs, Inc., New York, NY (US)

(72) Inventors: Muthu Baskaran, Jersey City, NJ (US); Richard A. Lethin, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 13/679,861

(22) Filed: Nov. 16, 2012

Related U.S. Application Data

(60) Provisional application No. 61/561,394, filed on Nov. 18, 2011.

(51) Int. Cl.
*G06F 9/44* (2006.01)
*G06F 9/45* (2006.01)

(52) U.S. Cl.
CPC .................................. *G06F 8/443* (2013.01)

(58) Field of Classification Search
CPC ..... G06F 17/16; G06F 17/271; G06F 17/272
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A | 4/1998 | Balasa et al. | |
| 5,920,854 A | 7/1999 | Kirsch et al. | |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |

(Continued)

OTHER PUBLICATIONS

Ju et al., Reduction of Cache Coherence Overhead by Compiler Data Layout and Loop Transformation, 1992.*

(Continued)

*Primary Examiner* — Li B Zhen
*Assistant Examiner* — Lenin Paulino
(74) *Attorney, Agent, or Firm* — Goodwin Procter LLP

(57) ABSTRACT

Methods, apparatus and computer software product for source code optimization are provided. In an exemplary embodiment, a first custom computing apparatus is used to optimize the execution of source code on a second computing apparatus. In this embodiment, the first custom computing apparatus contains a memory, a storage medium and at least one processor with at least one multi-stage execution unit. The second computing apparatus contains at least one vector execution unit that allow for parallel execution of tasks on constant-strided memory locations. The first custom computing apparatus optimizes the code for parallelism, locality of operations, constant-strided memory accesses and vectorized execution on the second computing apparatus. This Abstract is provided for the sole purpose of complying with the Abstract requirement rules. This Abstract is submitted with the explicit understanding that it will not be used to interpret or to limit the scope or the meaning of the claims.

66 Claims, 6 Drawing Sheets

(56) References Cited

U.S. PATENT DOCUMENTS

| | | |
|---|---|---|
| 6,279,113 B1 | 8/2001 | Vaidya |
| 6,327,699 B1 | 12/2001 | Larus et al. |
| 6,338,057 B1 | 1/2002 | Weeks |
| 6,651,246 B1 | 11/2003 | Archambault et al. |
| 6,754,650 B2 | 6/2004 | Cho et al. |
| 6,772,415 B1 | 8/2004 | Danckaert et al. |
| 6,785,677 B1 | 8/2004 | Fritchman |
| 6,792,546 B1 | 9/2004 | Shanklin et al. |
| 6,880,087 B1 | 4/2005 | Carter |
| 6,912,526 B2 | 6/2005 | Akaboshi |
| 6,952,694 B2 | 10/2005 | Mathur et al. |
| 6,952,821 B2 | 10/2005 | Schreiber |
| 7,086,038 B2 | 8/2006 | Cronquist et al. |
| 7,185,327 B2 | 2/2007 | Scales |
| 7,225,188 B1 | 5/2007 | Gai et al. |
| 7,260,558 B1 | 8/2007 | Cheng et al. |
| 7,594,260 B2 | 9/2009 | Porras et al. |
| 7,634,566 B2 | 12/2009 | Turner et al. |
| 7,757,222 B2 | 7/2010 | Liao et al. |
| 8,087,010 B2 | 12/2011 | Eichenberger et al. |
| 8,108,845 B2 | 1/2012 | Little et al. |
| 8,230,408 B2 | 7/2012 | Eng |
| 8,250,550 B2 | 8/2012 | Luszczek et al. |
| 8,255,890 B2 | 8/2012 | Luszczek et al. |
| 8,307,347 B2 | 11/2012 | Austin et al. |
| 2002/0021838 A1 | 2/2002 | Richardson et al. |
| 2003/0097652 A1 | 5/2003 | Roediger et al. |
| 2004/0034754 A1 | 2/2004 | Schreiber |
| 2004/0068501 A1 | 4/2004 | McGoveran |
| 2005/0097301 A1* | 5/2005 | Ben-David et al. ...... G06F 8/41 712/22 |
| 2005/0114700 A1 | 5/2005 | Barrie et al. |
| 2006/0031652 A1* | 2/2006 | Richter et al. .......... G06F 8/445 711/165 |
| 2006/0048121 A1 | 3/2006 | Blainey et al. |
| 2006/0048123 A1 | 3/2006 | Martin |
| 2006/0085858 A1 | 4/2006 | Noel et al. |
| 2007/0033367 A1 | 2/2007 | Sakarda et al. |
| 2007/0074195 A1 | 3/2007 | Liao et al. |
| 2007/0192861 A1 | 8/2007 | Varghese et al. |
| 2008/0010680 A1 | 1/2008 | Cao et al. |
| 2009/0037889 A1 | 2/2009 | Li et al. |
| 2009/0083702 A1* | 3/2009 | Eichenberger et al. ................... G06F 8/4452 717/109 |
| 2009/0083724 A1 | 3/2009 | Eichenberger et al. |
| 2009/0119677 A1 | 5/2009 | Stefansson et al. |
| 2009/0259997 A1 | 10/2009 | Grover et al. |
| 2009/0307673 A1 | 12/2009 | Eichenberger et al. |
| 2010/0050164 A1 | 2/2010 | Van De Waerdt et al. |
| 2010/0162225 A1 | 6/2010 | Huang et al. |
| 2011/0078226 A1* | 3/2011 | Baskaran et al. ....... G06F 17/16 708/607 |

OTHER PUBLICATIONS

Vera et al., An Accurate Cost Model for Guiding Data Locality Transformations, 2005.*
Aloul et al, Solution and Optimization of Systems of Pseudo-Boolean Consraints, IEEE Transactions on Computers, vol. 56, No. 1 0, Oct. 2007, pp. 1415-1424.
Buluc et al, Parallel Sparse Matrix-Matrix Multiplication and Indexing: Implementation and Experiments, SIAM Journal of Scientific Computing (SISC), 2012.
Chang et al, Parallel sparse supports for array intrinsic functions of Fortran 90, J. Supercomput. 18(3):305-339, (2001).
Davis, Direct Methods for Sparse Linear Systems. SIAM, 2006 (100 pgs.).
Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.
Gundersen et al, Sparsity in higher order methods for unconstrained optimization, Optimization Methods and Software, 27(2):275-294 (2012).
Gustavson, Two Fast Algorithms for Sparse Matrices: Multiplication and Permuted Transposition, ACM Transactions on Mathematical Software, 4(3): 250-269, 1978.
Kolda at al, Scalable Tensor Decompositions for Multiaspect Data Mining, in ICDM 2008: Proceedings of the 8th IEEE International Conference on Data Mining, Dec. 2008, pp. 363-372.
Lathauwer at al, On the Best Rank-1 and Rank-(R1,R2, . . . ,RN) Approximation of Higher-Order Order Tensors, SIAM J. Matrix Anal, Appl., 21:1324-1342, Mar. 2000.
Lin et al, Efficient data compression methods for multidimensional sparse array operations based on the EKMR scheme, IEEE Trans. Comput., 52(12)1640-1646, (2003).
Lin et al, Efficient Representation Scheme for Multidimensional Array Operations, IEEE Transactions on Computers, 51:327-345, 2002.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Vera et al, An Accurate Cost Model for Guiding Data Locality Transformations—Politecnica de Catatunya—Barcelona University—Sep. 2005.
Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000,14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, An Overview of the SUIF2 Compiler Infrastructure, Computer Systems Laboratory, Standford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model Is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The lpSolve Package, Sep. 21, 2007, pp. 1-9.
Bik et al, Implementation of Fourier-Motzkin Elimination, Technical Report 94-42, Department. of Computer Science, Leiden University, 1994.

(56) References Cited

OTHER PUBLICATIONS

Bondhugula et al, A Practical and Fully Automatic Polyhedral Program Optimization System,OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Automatic Mapping of Nested Loops to FPGAs, OSU, Mar. 19, 2007.
Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
Clearspeed—Accelerator Technology Primer, ClearSpeed Technology Primer, ClearSpeed Technology, Inc., 2006.
Clearspeed—ClearSpeed Programming Model: An introduction, ClearSpeed Technology Inc. 2007.
ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleration, Powerpoint presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.
ClearSpeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.

Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and the Control Dependence Graph, Mar. 7, 1991, pp. 1-52.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Feautrier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.

(56) References Cited

OTHER PUBLICATIONS

Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
Jimenez et al, Register Tiling in Nonrectangular Iteration Spaces, ACM Transactions on Programming Languages and Systems, vol. 24, No. 4, pp. 409-453, Jul. 2002.
Jonsson et al., "Verifying Safety Properties of a Class of Infinite-State Distributed Algorithms", Lecture Notes in Computer Science, 1995, vol. 939, pp. 42-53.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Mahajan et al., "Zchaff2004: An Efficient SAT Solver", LNCS, 2005, pp. 360-375.
Maydan et al, Array Data-Flow Analysis and its Use in Array Privatization, ACM—20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.

(56) References Cited

OTHER PUBLICATIONS

Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris—SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.
Wolf et al, A Data Locality Optimizing Algorithm, Proceedings of the ACM SIGPLAN '91 Conference on Programming Language Design and Implementation, Jun. 26-28, 1991, pp. 30-44.
Wu et al, Static Branch Frequency and Program Profile Analysis, 27th IEEE/ACM International Symposium on Microarchitecture (MICRO-27), 1994, 11 pgs.
Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

* cited by examiner

METHODS AND APPARATUS FOR JOINT SCHEDULING AND LAYOUT OPTIMIZATION TO ENABLE MULTI-LEVEL VECTORIZATION

CROSS REFERENCE TO RELATED APPLICATIONS

This application is related to and claims the benefit of priority to U.S. Provisional Application Ser. No. 61/561,394 filed on Nov. 18, 2011, the entirety of which is hereby incorporated by reference.

GOVERNMENT INTERESTS

This invention was made with Government support under Agreement No. HR0011-10-3-0007 awarded by DARPA. The Government has certain rights in the invention.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core and have access to vector units which require specific know-how to be fully utilized. One limitation that these architectures experience is that the current commercially available compilers cannot efficiently take advantage of the increase of computational resources.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a tradeoff between exploiting parallelism and exploiting locality to reduce the ever widening disparity between memory bandwidth and the frequency of processors: the memory wall. The tension between parallelism and locality of memory references is an important topic in the field of compiler optimization. More parallelism allows more concurrent execution of the parallel portions of a program. Additional parallelism implicitly relates to more available computational operations per second. Increasing locality directly translates into communication reduction between memories and processing elements. Typically, however, the portions of a program that may be executed in parallel are not interdependent, and as such these portions together may access non local data or data that are distributed throughout the memory, Because of these program semantics constraints, increasing parallelism may decrease locality and vice-versa.

An additional architectural phenomenon related to both parallelism and the memory wall is the ability for processors to better process data elements whose addresses in memory are evenly spaced (also referred to as constant strides). Such regularity of memory accesses allow the program to take advantage of hardware streaming prefetchers that increase the sheer memory bandwidth available to processors; as well as of vector units that allow the execution of multiple logical instructions as a single hardware instruction. This additional constant-stride memory constraint conflicts with parallelism and locality in the sense that programs with good parallelism and locality may not exhibit constant strides and vice-versa.

Current trends in computer architecture amplify the utilization of vector units on a chip. Modern multiple-core computer architectures that include general purpose multi-core architectures and specialized parallel architectures such as the IBM Cell Broadband Engine, Intel Xeon processors with SSE4 SIMD instructions, Intel Many Integrated Core Architecture with AVX extensions and NVIDIA Graphics Processing Units (GPUs) have very high computation power per chip thanks to the use of wide vector units per chip. Current and future architectures are increasingly evolving towards heterogeneous mixes of general purpose and specialized parallel architectures. Such an execution model comes with the need for the application to exhibit joint parallelism, locality and constant-strided memory accesses. Increased parallelism may be obtained by explicitly writing programs with more parallelism or by using auto-parallelizing compilers.

While programming such systems by hand has been demonstrated for a range of applications, this is a difficult and costly endeavor; likely one to be revisited to allow the application to port to rapidly arriving new generations and configurations of heterogeneous architectures and programming abstractions that change the optimization tradeoffs.

Even when programming models are explicitly parallel (threads, data parallelism, vectors), they usually rely on advanced compiler technology to relieve the programmer from scheduling and mapping the application to computational cores, understanding the memory model and communication details. Even provided with enough static information or annotations (OpenMP directives, pointer aliasing, separate compilation assumptions), compilers have a hard time exploring the huge and unstructured search space associated with these mapping and optimization challenges. Indeed, the task of the compiler can hardly been called optimization anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to the highly complex and heterogeneous machine.

The polyhedral model is a powerful framework to unify coarse grained and fine-grained parallelism extraction with locality and constant-strided memory access optimizations. To date, this promise has not yet been completely fulfilled as no existing affine scheduling and constant-strided memory technique can perform all these optimizations in a unified (i.e., non-phase ordered) and unbiased manner. Typically, parallelism optimization algorithms optimize for degrees of parallelism, but cannot be used to also optimize for constant-strided memory accesses. In like manner, algorithms used for data layout transformations reshape the position of data elements in memory but cannot be used both for extracting parallelism and locality. Additional difficulties arise when optimizing source code for the particular architecture of a target computing apparatus.

Therefore there exists a need for improved source code optimization methods and apparatus that can jointly optimize scheduling and constant-stride memory accesses at multiple level of the heterogeneous hardware hierarchy.

SUMMARY OF THE INVENTION

The present invention provides a system, apparatus and methods for overcoming some of the difficulties presented above. Various embodiments of the present invention provide a method, apparatus, and computer software product for optimization of a computer program on a first computing apparatus for execution on a second computing apparatus.

In an exemplary provided method computer program source code is received into a memory on a first computing apparatus. In this embodiment, the first computing apparatus' processor contains at least one multi-stage execution unit. The source code contains at least one arbitrary loop nest. The provided method produces program code that is optimized for execution on a second computing apparatus. In this method the second computing apparatus contains at least a multi-stage vector execution unit. With this unit there is an opportunity for vector operations through the exposition of both parallel operations and constant-stride memory accesses. In its optimization of the code, the first computing apparatus takes into account the opportunity for parallel operations and constant-stride memory accesses and analyses the tradeoff of execution costs between vector execution and non-vector execution on the second computing apparatus. In this embodiment, the first computing apparatus minimizes the total costs and produces code that is optimized for execution on the second computing apparatus.

In another embodiment, a custom computing apparatus is provided. In this embodiment, the custom computing apparatus contains a storage medium, such as a hard disk or solid state drive, a memory, such as a Random Access Memory (RAM), and at least one processor. In this embodiment, the at least one processor contains at least one multi-stage execution unit. In this embodiment, the storage medium is customized to contain a set of processor executable instructions that, when executed by the at least one processor, configure the custom computing apparatus to optimize source code for execution on a second computing apparatus. The second computing apparatus, in this embodiment, is configured with at least a multi-stage vector execution unit. With this unit there is an opportunity for vector operations through the exposition of both parallel operations and constant-stride memory accesses. In its optimization of the code, the first computing apparatus takes into account the opportunity for parallel operations and constant-stride memory accesses when additional data layout transformations are permitted and analyses the tradeoff of execution costs between vector execution and non-vector execution on the second computing apparatus. This configuration allows the execution of some tasks by the at least one vector unit and others in serial on a single execution unit. In the optimization process the at least one processor takes into account the tradeoff between the cost of data layout transformation operations on the second computing apparatus and the benefit of vector operations on a single vector multi-stage execution unit in the second computing apparatus.

Accordingly, in one aspect, a computer-implemented method, an apparatus including a processor and a memory including processor executable instructions that, when executed by the processor, configure the apparatus, and/or an article of manufacture including a non-transitory machine-readable medium storing instructions that, when executed by a machine, configure the machine are provided to receive a computer program in the memory. The method and/or instructions in the apparatus and/or the article are also provided to transform the computer program for execution on the second computing apparatus, the transformation comprising optimization of a selective tradeoff of a cost of parallelism, locality, vectorization and data-layout transformations to orchestrate computations associated with the program. Moreover, the program and/or instructions produce an optimized computer program for execution on the second computing apparatus.

In some embodiments, the optimization of the selective tradeoff includes determination of an optimization problem representing: (i) each statement in a set of statements in the program, at least one statement in the set being associated with a multi-dimensional memory reference; (ii) a set of candidate schedules, each candidate schedule representing at least a partial order of execution of operations in the program on the second computing apparatus, and (iii) a set of aggregate costs. Each aggregate cost may be a cost of execution according to a corresponding candidate schedule, and the aggregate cost may include a parallelism cost and a locality cost, and at least one of a vectorization cost and a data-layout transformation cost. The optimization of the selective tradeoff also includes optimization of the problem by selecting a loop transformation, a data layout transformation, or both to obtain a final schedule, such that the aggregate cost associated with the final schedule is minimized, and identification of the selected loop transformation, the selected data layout transformation, or both. The identified data layout transformation may correspond to any one dimension of the multi-dimensional memory reference.

In some embodiments, the aggregate cost corresponding to a candidate schedule in the set of candidate schedules is based on, at least in part, a static evaluation of a model of cost of executing operations of the at least one statement according to the candidate schedule. The aggregate cost corresponding to a candidate schedule in the set of candidate schedules may also be based on, at least in part, a dynamic evaluation of a model of cost of executing operations of the at least one statement according to the candidate schedule. The dynamic evaluation may be based on, at least in part, the second computing apparatus. The method and/or the instructions of the apparatus/article may iteratively refine the aggregate cost using at least one of the static evaluation and the dynamic evaluation.

In some embodiments, the method and/or the instructions provide for determining an search space to be used in the step of optimizing the optimization problem, and at least one candidate schedule in the set of candidate schedules is selected by traversing the search space. The search space, which may be an optimized search space, may be traversed exhaustively. The set of candidate schedules may include each schedule in the search space. In some embodiments, the set of operations includes at least one loop nest.

The transformation according to the method or that caused by the instructions may include receiving a first schedule dimension within several schedule dimensions associated with the loop nest. The optimization may include solving the optimization problem to obtain the final schedule, wherein the final schedule corresponds to the first schedule dimension. The first schedule dimension may corresponds to any linear combination of any loops in the loop nest.

The transformation according to the method or that caused by the instructions may additional include receiving a second schedule dimension within the plurality of schedule dimensions associated with the loop nest, adding schedule orthogonality constraints based on the first schedule dimension, and repeating the optimization by solving and identification based on the second schedule dimension. As a result, a loop transformation and/or a data layout transformation associated with the final schedule corresponds to one or both of the first and second schedule dimensions.

In some embodiments, the optimization includes computing a difference between: (a) speed of sequentially executing operations of a loop in the loop nest on a single execution unit in the second computing apparatus and (b) speed of executing those operations in parallel on a plurality of execution units in the second computing apparatus. In some embodiments, the loop nest includes first and second loops, and the optimization includes computing a difference between: (a) speed of alternately executing an operation of the first loop and an operation of the second loop and (b) speed of executing all operations of the first loop followed by executing all operations of the second loop.

The optimization may also include computing a difference between: (a) speed of executing operations of the at least one statement associated with the multi-dimensional memory reference such that a plurality of memory locations associated with the memory reference are accessed according to a uniform spacing between successive accesses and (b) speed of executing those operations such that the plurality of memory locations accessed are spaced apart nonuniformly. In some embodiments, the optimization includes a penalty for performing a data layout transformation so as to adjust a spacing between memory access associated with the multi-dimensional memory reference. The optimization may also include assigning a decision variable corresponding to at least one of parallelism, locality, vectorization, and data layout transformations.

In some embodiments, the set of operations includes one or more loop nest, and the decision variable specifies one or more of: (i) if a loop in the loop nest is to be executed in parallel by the second computing apparatus; (ii) if a pair of loops in the loop nest are to be executed together by the second computing apparatus; (iii) if a loop in the loop nest is to be executed as a vector loop; and (iv) if a memory reference associated with a loop within the loop nest requires a data layout transformation allowing for vector access to the memory reference during execution of operations of the loop. The optimization may include optimizing a global weighted parametric function of: (i) the parallelism cost, (ii) the locality cost, (iii) the vectorization cost, (iv) the data-layout transformations cost, and (v) four decision variables. The decision variables can be those described above.

In some embodiments, the method and/or the instructions provide for identifying several schedules of operations in the set of operations, at least one of the identified schedules improving one or more of parallelism, locality, vectorization, and contiguity of memory accesses of the at least some of the operations. The method and/or the instructions may provide for determining a set of conditions preserving semantic correctness of the program if the at least some of the operations are executed according to one of the schedules in the plurality of schedules. Each schedule violating at least one condition may be eliminated from the identified schedules, so as to obtain a search space to be used for optimizing the selective tradeoff.

BRIEF DESCRIPTION OF THE DRAWINGS

Various embodiments of the present invention taught herein are illustrated by way of example, and not by way of limitation, in the figures of the accompanying drawings, in which.

Figure 1:
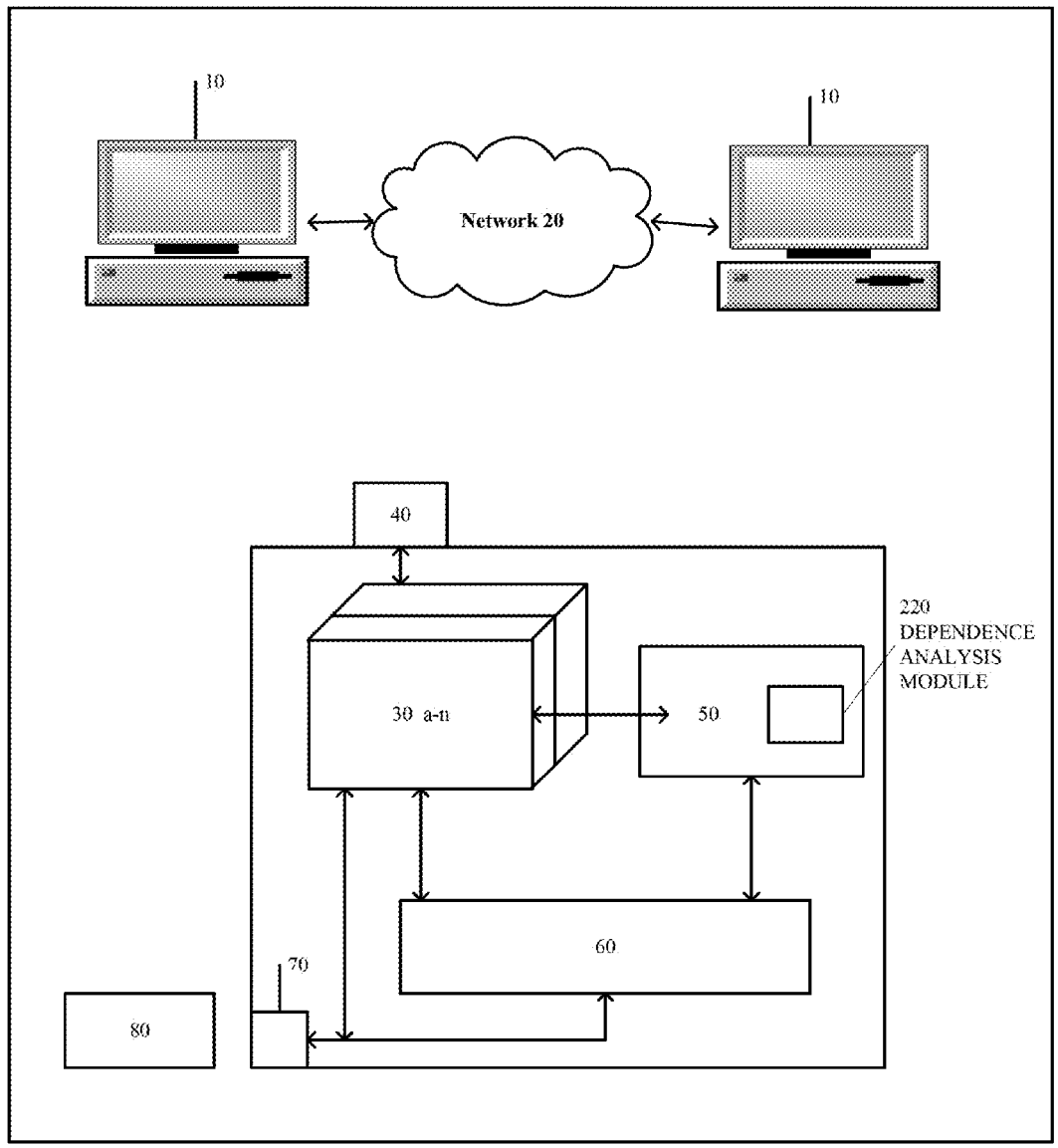
FIG. 1 illustrates a computer network and a computing apparatus consistent with provided embodiments.

It will be recognized that some or all of the figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The trend of increasing the frequency at which processors perform computations has come to an end. Power consumption and control complexity have reached such high levels that manufacturers are backing out of this design path. Current machines have evolved to multiprocessor architectures on a chip with increasingly many cores per chip and multiple threads per core. This trend is expected to dramatically increase, reaching thousands of cores per chip in the next few years. Thus, modern computers increasingly need to exploit parallelism at different levels to provide sustained performance. On the other hand, parallel programming techniques have not evolved at the same speed and the gap between theoretical machine speed and actual utilization continues to increase. In this context, an important source of performance resides in the vector units of processors.

Compilers are responsible for translating the abstract operational semantics of the source program, i.e., a text description of what the program's execution is supposed to perform, into an executable form that makes efficient use of a highly complex heterogeneous machine. Multiple architectural phenomena occur and interact simultaneously within the targeted computer during the execution of the program; this requires the optimizing compiler to combine multiple program transformations in order to define a program execution that takes advantage of those architectural phenomena. For instance, when targeting computers that have multiple processing elements (multi-core computers), there is often a trade-off between exploiting more processing elements simultaneously (parallelism) and exploiting data access locality to reduce memory traffic. Indeed, the speed and bandwidth of the memory subsystems are almost always a bottleneck. The problem is typically worse for multi-core computers. The tradeoffs between parallelism and locality are but one aspect of the optimization problem. Another important aspect is the tradeoff with constant-strided memory accesses. Constant-strided memory accesses have been linked to good utilization of hardware memory prefetchers, boosting the memory bandwidth capabilities of modern micro-processors. Additionally, when parallelism at the proper granularity is available concurrently with constant-strided memory accesses, vector execution is enabled. Obtaining both parallelism and constant-strided memory accesses is traditionally implemented as a multi-phase process in which loop transformations are selected, then a data memory layout transformation is sought. It is an object of this invention to provide a joint formulation to optimize these phases simultaneously. It is a further object of this invention to provide a search procedure to traverse a joint search space and extract good tradeoffs between parallelism, locality and constant-strided memory accesses that can be further exploited for vector execution.

Since, in traditional compilers, optimization problems are associated with huge and unstructured search spaces, this combinational task is poorly achieved in general, resulting in poor scalability and disappointing sustained performance of the supposedly optimized program.

Overview of Traditional Loop Properties and Transformations

It is an object of embodiments of the present invention to provide a customized computing apparatus, methods, and computer software product that simultaneously optimizes a computer program for execution on a particular computing device with vector execution units. It is another object of the invention to provide embodiments of methods which can explore the complete solution space for legal schedules for potential solutions. It is a further object of the invention to provide methods containing new formulations that encode the tradeoffs between parallelism, locality, constant-strided memory accesses and vectorization directly in the constraints and the objective functions of an optimization problem.

The following code example illustrates loop fusion. Given the following code:

```
int i, a[100], b[100];
for (i=0; i<100; i++) {
a[i]=1;
}
for (i=0; i<100; i++) {
b[i]=2;
}
```

The effect of loop fusion is to interleave the execution of the first loop with the execution of the second loop.

```
int i, a[100], b[100];
for (i=0; i<100; i++) {
a[i]=1;
b[i]=2;
}
```

A consequence of loop fusion is that memory locations a[i] and b[i] referenced by the former 2 loops are now accessed in an interleaved fashion. In the former code, memory locations were accessed in the order a[0], a[1], . . . a[100] then b[0], b[1], . . . b[100]. In the code comprising the fused loops, the memory locations are now accessed in the order a[0], b[0], a[1], b[1], . . . a[100], b[100]. Loop fusion can lead to better locality when multiple loops access the same memory locations. It is common general knowledge in the field of compilers that better locality reduces the time a processing element must wait for the data resident in memory to be brought into a local memory such as a cache or a register. In the remainder of this document, we shall say that loops are fused or equivalently that they are executed together when such a loop fusion transformation is applied to the received program to produce the optimized program.

Loop fusion can change the order in which memory locations of a program are accessed and require special care to preserve original program semantics:

```
int i, a[100], b[100];
for (i=0; i<100; i++) {
a[i]=1;
}
for (i=0; i<100; i++) {
b[i]=2+a[i+1];
}
```

In the previous program, the computation of b[i] depends on the previously computed value of a[i+1]. Simple loop fusion in that case is illegal. If we consider the value computed for b[0]=2+a[1], in the following fused program, b[0] will read a[1] at iteration i=0, before a[1] is computed at iteration i=1.

```
int i, a[100], b[100];
for (i=0; i<100; i++) {
a[i]=1;
b[i]=2+a[i+1];
}
```

It is common general knowledge in the field of high-level compiler transformations that enabling transformations such as loop shifting, loop peeling, loop interchange, loop reversal, loop scaling and loop skewing can be used to make fusion legal.

The problem of parallelism extraction is related to the problem of loop fusion in the aspect of preserving original program semantics. A loop in a program can be executed in parallel if there are no dependences between its iterations. For example, the first program loop below can be executed in parallel, while the second loop must be executed in sequential order:

```
int i, a[100], b[100];
for (i=0; i<100; i++) {
a[i]=1;
}
for (i=1; i<100; i++) {
b[i]=2+b[i-1];
}
```

It is common knowledge in the field of high-level compiler transformations that the problems of fusion and parallelism heavily influence each other. In some cases, fusing 2 loops can force them to be executed sequentially.

Loop permutability is another important property of program optimizations. A set of nested loop is said permutable, if their order in the loop nest can be interchanged without altering the semantics of the program. It is common knowledge in the field of high-level compiler optimization that loop permutability also means the loops in the permutable set of loops dismiss the same set of dependences. It is also common knowledge that such dependences are forward only when the loops are permutable. This means the multi-dimensional vector of the dependence distances has only nonnegative components. Consider the following set of loops:

```
int i,j, a[100][100], b[100][100];
for (i = 0; i < 99; i++) {
    for (j = 0; j < 99; j++) {
        a[i+1][j+1] = a[i][j] + a[i][j+1]; // statement S
    }
}
```

There are 2 flow dependences between the statement S and itself. The two-dimensional dependence vectors are: (i−(i−1), j−(j−1))=(1,1) and (i−(i−1), j−j)=(1, 0). The components of these vectors are nonnegative for all possible values of i and j. Therefore the loops l and j are permutable and the loop interchange transformation preserves the semantics of the program. If loop interchange is applied, the resulting program is:

```
int i,j, a[100][100], b[100][100];
for (j = 0; j < 99; j++) {
    for (i = 0; i < 99; i++) {
        a[i+1][j+1] = a[i][j] + a[i][j+1]; // statement S
    }
}
```

Loop permutability is important because it allows loop tiling (alternatively named loop blocking). Loop tiling is a transformation that changes the order of the iterations in the program and ensures all the iterations of a tile are executed before any iteration of the next tile. When tiling by sizes (i=2, j=4) is applied to the previous code, the result is:

```
int i,j,ii,jj a[100][100], b[100][100];
for (j = 0; j < 99; j+=4) {
    for (i = 0; i < 99; i+=2) {
        for (jj = 4*j; jj < 4*j+4; jj++) {
            for (ii = 2*i; ii < 2*i+2; ii++) {
                a[ii+1][jj+1] = a[ii][jj] + a[ii][jj+1]; // statement S
            }
        }
    }
}
```

Consider the memory locations written by the statement S. Before tiling, the locations are written in this order: a[1] [1], a[1] [2] . . . a[1] [99], a[2] [1], a[2] [2] . . . a[2] [99], a[3] [1] . . . . After tiling, the new order of writes is the following: a[1] [1], a[2] [1], a[1] [2], a[2] [2] . . . a[1] [4], a[2] [4], a[4] [1], a[5] [1], a[4] [2], a[5] [2] . . . a[4] [4], a[5] [4] . . . . It is additionally common knowledge that loop tiling results in better locality when the same memory locations are written and read multiple times during the execution of a tile.

Loop tiling is traditionally performed with respect to tiling hyperplanes. In this example, the tiling hyperplanes used are the trivial (i) and (j) hyperplanes. In the general case, any linearly independent combination of hyperplanes may be used for tiling, provided it does not violate program semantics. For example, (i+j) and (i+2*j) could as well be used and the resulting program would be much more complex.

Another important loop transformation is loop skewing. It is common knowledge that loop permutability combined with loop skewing results in the production of parallelism. In the following permutable loops, the inner loop can be executed in parallel after loop skewing:

```
int i,j a[100] [100], b[100] [100];
for (i=0; i<100; i++)
for (j=0; j<100; j++) {
a[i+1] [j+1]=a[i] [j]+a[i] [j+1];
}
}
```

After loop skewing the code is the following and the inner loop j is marked for parallel execution:

```
int i,j a[100] [100], b[100] [100];
for (i=0; i<197; i++) {
    doall (j=max(0, i−98); j<=min(98,i); j++) {
        a[i+1−j] [j+1]=a[i−j] [j]+a[i−j] [j+1];
    }
}
```

The skewing transformation helps extract parallelism at the inner level when the loops are permutable. It is also common knowledge that loop tiling and loop skewing can be combined to form parallel tiles that increase the amount of parallelism and decrease the frequency of synchronizations and communications in the program.

Another desirable property of a program is the access to constant-strided memory locations which can enable hardware streaming prefetchers as well vector and SIMD unit utilization. In the following program, accesses to array a exhibit constant-strided memory accesses along loops i and j and memory dimensions 0 and 1.

```
int i,j a[100] [100];
for (i=0; i<100; i++) {
    for (j=0; j<100; j++) {// constant stride memory access loop
        a[i+1] [j+1]=a[i] [j]+a[i] [j+1];
    }
}
```

In contrast, the following program exhibits a non constant-strided memory access to array a along loop j by virtue of the a[i+j+1] [j+1]. A sufficient condition for constant-strided memory access along loop j is clear: the index j may appear only once in each access function.

```
int i,j a[100] [100];
for (i=0; i<100; i++) {
    for (j=0; j<100; j++) {// non-constant stride memory access loop
        a[i+j+1] [j+1]=a[i] [j]+a[i] [j+1];
    }
}
```

In addition, when a loop exhibits constant-stride memory access and is also parallel, the loop has vectorization semantics. The following 2 examples illustrate innermost (along j) and outermost (along i) vector loop semantics, respectively.

```
int i,j a[100] [100];
for (i=0; i<100; i++) {
    doall (j=0; j<100; j++) {// inner-vectorizable loop
        a[i+1] [j+1]=a[i] [j]+a[i] [j+1];
    }
} int i,j a[100] [100];
doall (i=0; i<100; i++) {// outer-vectorizable loop
    for (j=0; j<100; j++) {
        a[j−1] [i+1]=a[j] [i]+a[j−1] [i];
    }
}
```

When either a loop lacks doall semantics or a single access has non-constant-stride access along said loop, the loop does not exhibit vectorization semantics.

Additional opportunities are available when considering data layout transformations and allowing constant-strided memory accesses along the non-innermost memory dimension. The following example demonstrates a loop that does not have constant-strided innermost memory dimension access: whatever the schedule chosen, either A or B will have non-constant stride access along the innermost memory dimension.

```
int i,j a[100] [100], b[100] [100];
for (i=0; i<100; i++) {
doall (j=0; j<100; j++) {// non-vectorizable loop
a[i] [j]=a[i] [j]*b[j] [i];
}
}
```

It is possible to relax the innermost memory dimension constraint and allow constant-strided memory access along any memory dimension, provided the proper data layout transformations are inserted. In the following example, b_tmp is an auxiliary array introduced to hold the results of such a data layout transformation; loop j now exhibits vectorization semantics.

```
int i,j a[100] [100], b[100] [100];
doall (i=0; i<100; i++) {// data layout transformation
doall (j=0; j<100; j++) {
b_tmp[i] [j]=b[j] [i]
}
}
for (i=0; i<100; i++) {
doall (j=0; j<100; j++) {// vectorizable loop
a[i] [j]=a[i] [j]*b_tmp[i] [j];
}
}
doall (i=0; i<100; i++) {// reverse data layout transformation
doall (j=0; j<100; j++) {
b[i] [j]=b_tmp[j] [i]
}
}
```

It is a further objective of this innovation to provide a search procedure to distinguish between those cases and exhibit schedules that maximize the amount of vectorizable loops while minimizing the cost of data layout transformations. These objectives are conflicting and it is a further objective to balance them with optimizations for parallelism and locality.

Search for Program Transformations

Generating efficient code for deep parallelism and deep memory hierarchies with additional vector units is a difficult task: the compiler (and run-time system) has to take the burden of tasks that only expert programmers would be able to carry. In order to exploit parallelism the first necessary step is to compute a representation which models the producer/consumer relationships of a program as closely as possible. The power of an automatic optimizer or parallelizer greatly depends on its capacity to decide whether two portions of the program execution may be interchanged or run in parallel. Such knowledge is related to the task of dependence analysis which aims at precisely disambiguating memory references. The issue is to statically form a compact description of the dynamic properties of a program. Forming a precise description is generally undecidable and approximations have to be made.

When considering high-level loop transformations, it is common practice to represent dependences in the form of affine relations. The first step is to assign to each statement in the program an iteration space and an iteration vector. Consider the program composed of the 2 loops below:

```
for (i=1; i<=n; i++) {
  for (j=1; j<=n; j++) {
    a[i] [j]=a[i] [-1+j]+a[j] [i]; // statement S
  }
}
```

The iteration domain of the statement S is $D=\{[i, j]$ in $Z2| 1 \leq i \leq n, 1 \leq j \leq n\}$. The second step is to identify when two operations may be executed in parallel or when a producer consumer relationship prevents parallelism. This is done by identifying the set of dependences in the program. In this example, the set of dependences is: $R=\{[[i, j], [i', j']]|i=i', j=j'-1, [i, j]$ in $D, [i', j']$ in $D, <S, [i, j]> <<< S, [i', j']>\}$ union $\{[[i, j], [i', j']]|i=j', j=i', [i, j]$ in $D, [i', j']$ in $D, <S, [i, j]> <<< S, [i', j']>\}$, where $<<$ denoted multi-dimensional lexicographic ordering. This relationship can be rewritten as: a[i,j] a[j,i] $\{([i, j], [j, i])|\leq 1$ j, $i \leq n, -j+i-1 \geq 0\}$ union a[i,j] a[i,j-1] $\{([i, j+1], [i, j])|1 \leq j \leq n-1, 0 \leq i \leq n\}$.

It is common practice to represent the dependence relations using a directed dependence graph whose nodes represent the statements in the program and whose edges represent the dependence relations. In the previous example, the dependence graph has 1 node and 2 edges. It is common practice to decompose the dependence graph in strongly connected components. Usually, strongly connected components represent loops whose semantics require them to be fused in the optimized code. There are many possible cases however and one of the objects of this invention is also to perform the selective tradeoff of which loops to fuse at which depth. It is common knowledge that a strongly connected component of a graph is a maximal set of nodes that can be reached from any node of the set when following the directed edges in the graph.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs. The polyhedral model is a representation of a program's structure particularly suited for expressing complex sequences of loop nests, complex sequences of loop nest transformations, and other relevant information such as for instance dependences, communications, and array layouts.

A polyhedron is defined as a set of points verifying a set of affine inequalities and equalities on a number of variables. There exist alternate but equivalent definitions for polyhedrons, such as the one based on a combination of vertices, rays and lines proposed by Minkowski. There are also alternate representations, often based on the alternate definitions. While the present disclosure teaches using one of those definitions and representations to illustrate the various embodiments, various embodiments are in no way restricted to a particular definition or representation.

A polyhedral domain is defined as a finite union of polyhedrons. One of the main interests in using polyhedral domains is that they provide a precise representation of sets and relations among sets, on which many optimization problems can be phrased and solved using a rich set of algorithms, which are mostly available in the literature. Some embodiments of the sets in question represent loop iterations, mono- and multi-dimensional data sets, sets of processing elements, data transfers, synchronizations, and dependences. Thus, essential characteristics of the execution of a program can be summarized into compact mathematical objects, polyhedrons, which can be manipulated and transcribed into an executable program that has desired execution properties.

The polyhedral model is a mathematical abstraction to represent and reason about programs in a compact representation. In an embodiment, this innovation operates on a generalized dependence graph (GDG)-based Intermediate Representation (IR) containing the following information.

In some embodiment, a statement S is a set of operations grouped together. Statements are the atomic unit of scheduling and often correspond to a statement in the original program. Depending on the level of abstraction, a statement can be arbitrarily simple (i.e. micro-code) or arbitrarily complex (i.e. external precompiled object).

In another embodiment, an iteration domain DS is an ordered set of iterations associated to each statement S and describes the loop iterations in the original program which control the execution of S. To model multiple levels of nested loops, iteration domains are multi-dimensional sets. Order between 2 iterations i1 and i2 of S is written i1<<i2 if S(i1) occurs before S(i2) in the program.

In a further embodiment, a memory reference F is a function that maps domain iterations to locations in the memory space. The image of DS by F represents the set of memory locations read or written by S through memory reference F. If F is injective, distinct memory locations are touched; otherwise, memory reuse exists within the program. Each statement can access multiple memory references in read and/or write mode.

In yet another embodiment, a scheduling function $\Theta^S$ maps the iterations of S to time. It is a partial order that represents the relative execution order of each iteration of S relative to all other iterations of any statement in the program. Well-established terminology in the field decomposes $\Theta^S$ in a linear part $\alpha$ for unimodular and non-unimodular loop transformations, a parametric constant part $\Gamma$ for multi-dimensional shifts and a constant vector $\beta$ that encodes all possible imperfectly nested loop structures. If the function is injective, the output program is sequential; otherwise parallel iterations exist. In particular, the order << extends to time after scheduling is applied.

In an embodiment, a dependence $\Delta=\{T \rightarrow S\}$ is a relation between the set of iterations of S and T. It conveys the information that some iteration of T "depends on" some iteration of S: they access the same memory location by application of a memory reference and that iS<<iT in the original program. We write the set relation $\{(iT, iS)\}$ to refer to the specific iterations of T and S that take part in the dependence. With this notation, in the case of a read-after-write dependence, T would be a read and S would be a write.

It is a particular object of this invention to form the convex set of all legal schedules in the program. In this multi-dimensional formulation, dependences in the program are modeled by dependence edges in the GDG. Each edge is decorated by a dependence polyhedron. It is common knowledge in the field that a necessary and sufficient condition for a transformed program to be legal is that the order of all iterations in a dependence be preserved. The convex set of all legal schedules is constructed by virtue of the linear inequality constraints:

$$\forall \Delta = \{T \rightarrow S\}, \forall k \in [1, \min(d^S, d^T)], \forall (i^T, i^S) \in \Delta:$$

$$\begin{cases} \delta_k^\Delta \in \{0, 1\} \\ \sum_{l=1}^{\min(d^S, d^T)} \delta_l^\Delta = 1 \\ \Theta_k^T(i^T) - \Theta_k^S(i^S) \geq -\mathcal{N}_\infty \left( \sum_{l=1}^{l \leq k-1} \delta_l^\Delta \right) \cdot (\vec{n} + 1) + \delta_k^\Delta \end{cases}$$

One such inequality constraint is constructed for each dependence in the program, each schedule depth k and each point in the dependence: $\forall \Delta=\{T \rightarrow S\}$, $\forall k \in [1, \min(d^S, d^T)]$, $\forall (i^T, i^S) \in \Delta$. The $\delta_k^\Delta \in \{0,1\}$ Boolean decision variables express that each dependence is strongly satisfied at some depth l where the sum of these decision variables becomes 1: $\Sigma_{l=1}^{\min(d^S,d^T)} \delta_l^\Delta = 1$. Before the dependence is strongly satisfied, the sum $\Sigma_{l=1}^{l \leq k-1} \delta_l^\Delta$ is 0 and the inequality $$\Theta_k^T(i^T) - \Theta_k^S(i^S) \geq -\mathcal{N}_\infty \left( \sum_{l=1}^{l \leq k-1} \delta_l^\Delta \right) \cdot (\vec{n} + 1) + \delta_k^\Delta$$

reduces to $\Theta_k^T(i^T) - \Theta_k^S(i^S) \geq \delta_k^\Delta \geq 0$. At the depth at which the dependence is strongly satisfied, said inequality reduces to $\Theta_k^T(i^T) - \Theta_k^S(i^S) \geq \delta_k^\Delta \geq 1$. After the dependence is strongly satisfied, said inequality becomes irrelevant by virtue of a large negative term $-\mathcal{N}_\infty(\Sigma_{l=1}^{l \leq k-1} \delta_l^\Delta)$, where $\mathcal{N}_\infty$ is a large enough static value fixed for the program and $(\Sigma_{l=1}^{l \leq k-1} \delta_l^\Delta)$ is a quantity greater than 1 once strong satisfaction has been achieved. Possible embodiments of this invention build a complete linear search space for all admissible values of k and all dependences in the program.

In some embodiments, invertible schedules are exhibited. When $\alpha$ is not invertible, it is always possible to complete it into a full-rank schedule to iterate over all the points in the domain. In some embodiment, this completion is performed at code generation and consists in adding innermost parallel loops to each statement. In some embodiments, this procedure degrades the parallelism granularity and does not exploit degrees of freedom in the program to improve locality, constant strided memory accesses or vectorization. In these embodiments, singular schedules give the impression a loop dimension is parallel with the caveat that it may contain only a single point. It is a purpose of our invention to avoid this issue.

The following example exemplifies the problem. Consider the example of a single statement S(i, j, k). In this example, the objective is to maximize the 2 outermost degrees of parallelism; the returned schedule/parallelism markers may be (i, i, j)/(doall, doall, seq).

```
int i,j, jj, k, a[100] [100] [100];
for (i=0; i<100; i++) {
for (j=0; j<100; j++) {
for (k=0; k<100; k++) {
a[i+1] [j+1] [k]=b[i] [k] [j]+b[k] [i] [j+1];
}
}
}
```

The following code exemplifies the singular schedule (i, i, j)/(doall, doall, seq) with the "doall-j" loop executing only 1 iteration.

```
int i,j,k, a[100] [100] [100];
doall (i=0; i<100; i++) {
doall (jj=i; jj<=i; jj++) {
```

```
for (j=0; j<100; j++) {
a[i+1] [j+1] [k]=b[i] [k] [j]+b[k] [i] [j+1];
}
}
}
}
```
In this form, the program is incorrect and a subsequent non-singular completion would result in the following code:

```
int i,j,jj, k, a[100][100][100];
doall (i = 0; i < 100; i++) {
    doall (jj = i; jj <= i; jj++) {
        for (j = 0; j < 100; j++) {
            doall (k = 0; k < 100; k++) {
                a[i+1][j+1][k] = b[i][k][j] + b[k][i][j+1];
            }
        }
    }
}
```

The result of the completion step is to transform the singular schedule (i, j) into a full-rank schedule of rank 3: (i, i, j, k)/(doall, doall, seq, doall). By the linear redundancy of the first two dimensions, the full rank schedule is equivalent to (i, j, k)/(doall, seq, doall). In other words, a scheduler may wrongly think it has found 2 outermost levels of parallelism when it may have missed a potential (k−i, j+i, i+j+k)/(doall, doall, seq) solution.

It is the purpose of our innovation to use the convex multi-dimensional formulation of all legal schedules to search for invertible schedules. In a possible embodiment, the procedure computes full ⊖ schedules at each step; that is all the elements of a square ⊖ matrix. These schedules may not be invertible as a result of a single step of the integer linear programming optimization problem. In other embodiments, additional linear independence constraints are added incrementally, from the lower dimensions to the higher dimensions, while searching for a full ⊖ schedule. Since a singular schedule can always be completed at the innermost level, this proposed embodiment will always succeed. Linear independence constraints are added using the expression of orthogonal subspaces which is well-known in the field of polyhedral compilation. As an illustration, consider a 3×3 schedule matrix. In the first step, the integer linear programming problem has no linear independence constraints. A possible result could be schedule (k, j, k). At the first step, the search procedure would retain only the first row (k) and would iterate again by adding the constraint {k}-orthogonal to the integer linear programming problem. A possible result for the second iteration would be (k, i+j, i+j+k). This schedule is still singular because it is of rank 2. The algorithm then iterates and adds the constraints {k, i+j}-orthogonal. Eventually at the third iteration, the solution could resemble (k, i+j, i−k) is guaranteed to be invertible.

In further embodiments, the constant strided memory access constraints necessitate the multi-dimensional formulation and the search of full ⊖ functions at each step.

Scheduling for Constant-Strided Memory Access

In some embodiments, the scheduling algorithm performs tradeoffs between the amount of parallelism, amount of locality and amount of constant strided memory accesses in a joint optimization problem. Constant-stride memory accesses result in optimized spatial reuse for memory hierarchies where accessing a regularly spaced set of memory references is crucial to obtaining high performance. Such hardware features include hardware prefetch streams, simd and vector operations, and coalescing hardware in GPUs.

In further embodiments, constant strided access for a statement S along an access function F is characterized by the linear part of an r-dimensional access function F to a memory reference R. In such cases where the affine part of the scheduling function α is invertible, constant stride access along memory dimension r and along some (unspecified) schedule dimension d, for reference F is obtained when card{i|$m_{r,i}$≠0}≤1 in:

$$F \cdot \alpha^{-1} = \begin{bmatrix} M \\ m_{r,1} \ldots m_{r,t} \end{bmatrix}^t$$

That is when at most one non-zero entry exists on the last r-th column of the $F \cdot \alpha^{-1}$ matrix. If additionally, card{i|$m_{r,i}$≠0}=0, the constant stride is 0 and both spatial and temporal reuse are available.

Further embodiments include this additional card constraint in an integer linear programming search procedure. In such embodiments, the last column of the inverse of the matrix F represents the innermost dimension of the array access after the process of polyhedral code generation. Other embodiments, use the notation $U_{\bar{k}}$ to denote the sub-matrix obtained by removing row k from given a matrix U. When the number of loops enclosing statement S is d, the invertible affine schedule matrix α has d rows and we are interested in $\alpha_{\bar{d}}$. Constraints for a single statement S of dimension d accessing a memory reference R with access function F are described. The coefficients of the matrix F are known; coefficients of α are unknown. Constant-stride access along the innermost schedule dimension d of S and along the innermost array subscript r proceeds as follows. For each tuple F, d and r, a contiguity decision variable $c_{r,d}^F$ encodes whether contiguity is achieved along memory dimension r and schedule dimension d. The constraints added to the multi-dimensional linear space of all legal schedules to link $c_{r,d}^F$ are:

$$c_{r,d}^F \in \{0,1\}$$

$$\mu - F_{\bar{r}} \cdot \lambda + N_\infty \cdot (1 - c_{r,d}^F) \geq 0$$

$$-\mu + F_{\bar{r}} \cdot \lambda + N_\infty \cdot (1 - c_{r,d}^F) \geq 0$$

Where μ is the current row of α being computed, λ are unconstrained variables to help write the linear dependence of μ on $F_{\bar{r}}$ and $N_\infty$ are large enough constants. Such an embodiment realizes a search procedure for a schedule α such that the access to the r-th memory dimension has a constant stride.

Other embodiments drive the search in the constraint space by virtue of maximizing a cost function for maximal expected benefit of constant-strided memory accesses:

$$\sum_{\substack{S \in G \\ d=d^S}} \sum_{\substack{R \in S \\ r=dim(F)}} \rho_{r,d}^F \cdot c_{r,d}^F$$

Where $\rho_{r,d}^F$ are cost coefficients chosen to quantify the expected benefits of statement S accessing memory reference F with a constant strided access along array dimension r and schedule dimension d. Costs for constant strided accesses are traded off for costs of parallelism and locality by forming an additive linear cost function. The coefficients $\rho_{r,d}^F$ depend on properties of memory accesses (latency, bandwidth, volume of data) and whether more precedence is given to parallelism, locality or other constraints.

The following examples illustrate the effects of affine transformations α on strided memory accesses. The linear programming objectives used are, in their order of magnitude (1) maximize the constant strided memory access metric and (2) minimize the absolute value of schedule coefficients in α. In particular, these examples only attempt to optimize constant-strided accesses along the innermost level of schedule and the innermost level of memory. The original code is exhibited on the left and the result of optimizing constant strided access on the right.

```
for (i=1; i<=N; i++) {            for (i=1; i<=N; i++) {
  for (j=1; j<=N; j++) {            for (j=-N+1; j<=N-1; j++) {
    for (k=1; k<=N; k++) {            for (k=max;(-j+1,1) ;
      A[i-k][k]=A[i-k][k]+1;          k<=min(-j+N, N); k++) {
}}}                                     A[-j][j+k]=A[-j][j+k]+1;
                                  }}}
```

In a possible embodiment of our invention, the above example illustrates the optimization of a single array reference. The schedule is α=(j,−i+k, i) and the access to A is constant stride along k in the innermost array dimension with stride 1 on k.

```
                                  for (i=2; i <= N+1; i++) {
                                    for (j=2; j <= M+1; j++) {
for (i=2; i <= i+N; i++) {            for (k=1; k <= L; k++) {
  for (j=2; j <= 1+M; j++) {            A[j][i][k]=A[j][i][k-1]+
    for (k=1; k <= L; k++) {            A[j][i-1][k];
      A[k][i][j]=A[k][i][-1+j]+    }}}
      A[k][-1+i][j];              for (i=2; i <= M+1; i++) {
      B[i+k][i][j]=A[k][i][j]+      for (j=2; j <= N+1; j++) {
      B[k][i][j];                     for (k=1; k <= L; k++) {
}}}                                     B[i+1][j][k]=A[i][j][k]+
                                        B[i][j][k];
                                  }}}
```

In another possible embodiment of our invention, the above example illustrates the optimization of multiple array references and the tendency of the schedule to fission loops in the absence of any fusion optimization objective. The schedule computed is α=(i, k, j) for the first statement and α=(k, i, j) for the second.

Scheduling for Vectorization

Further embodiments also encompass specifying optimization costs and decision variables for vectorizable execution of loops. For each statement S of depth d and each loop level I in [1,d], a decision variable $\Sigma_I^S$ is introduced which encodes whether statement S is vectorizable along loop I. Constraints are added to ensure that a loop is vectorizable only if it is parallel: $0 \leq \Sigma_I^S \leq \Delta_I^S$. Additional details regarding scheduling and processes related to the various embodiments described herein are described in Applicants' co-pending U.S. patent application Ser. No. 12/561,152, published as U.S. Pat. App. Pub. No. 2010/0070956, titled "Methods and Apparatus for Joint Parallelism and Locality Optimization in Source Code Compilation, the contents of which are incorporated herein by reference in their entirety.

Constant stride access constraints for all references within a statement are linked together, one schedule dimension at a time for each tuple (S, I, F) where S is a statement, I a loop enclosing the statement, F an access function for S: $0 \leq \Sigma_I^S \leq c_{r,I}^F$, where r is the dimension of F. Constant stride constraints force all arrays touched by S to be accessed with a constant stride along schedule dimension I if the loop I is to be vectorizable.

Cost coefficients for vectorization are introduced. For each $\Sigma_I^S$, a corresponding cost coefficient $\sigma_I^S$ is introduced and the cost for vectorizable loops is introduced as another linear objective in the global cost function:

$$\sum_{\substack{S \in \mathcal{G} \\ I \in [1, d^S]}} \sigma_I^S \cdot \Sigma_I^S$$

```
                                  doall (i=5; i<=N+M+L+2; i++) {
for (i=2; i<=1+N; i++) {            for j=max(2, i-N-L-1);
  for (j=2; j<=1+M; j++) {            j<=min(M+1, i-3); j++) {
    for (k=1; k<=L; k++) {            for (k=max(2, i-j-L);
      A[i][j][k]=A[i][j-1][k+1]+       k<=min(i-j-1, N+1); k++ {
      A[i-1][j][k+1];                  A[k][j][i-j-k]=
}}}                                    A[k][j-1][i-j-k+1]+
                                       A[k-1][j][i-j-k+1];
                                  }}}
```

In some embodiments, the example above demonstrates the results of setting larger cost coefficients for the value of the outermost i loop. In the above example, the code on the left represents the original program and the code on the right represents the transformed program. The outermost loop doall i is parallel and accesses the array A with a constant stride of 1; it is therefore vectorizable at the outermost level. The schedule achieving this vectorization is (i+j+k,j,k) and is obtained by minimizing the global cost function $$\sum_{\substack{S \in \mathcal{G} \\ I \in [1, d^S]}} \sigma_I^S \cdot \Sigma_I^S$$

on the system of constraints described.

Data Layout to Enable Vectorization

In further embodiments of our innovation, contiguous strided accesses along multiple memory dimensions are exploited, making the problem less constrained and allowing more opportunities for vectorization. In such embodiments, data layout transformations are discovered during the search for a tradeoff between parallelism, locality, constant-strided access and vectorization. Data layout transformations permute the constant strided access dimension with the innermost array dimension to make minimize the length of the stride. Data layout transformations are applied in a subsequent optimization phase. In some embodiments, the output of our innovation is a schedule ⊖ for each statement S in the program and a data layout transformation "DL" for each array accessed in the program.

In further embodiments, new Boolean decision variables $p_I^{S,A}$ are introduced for each tuple (S, A, I) consisting of a statement S, an array A accessed by that statement and a possible schedule depth I for S. Each decision variable encodes whether all the references to A within S have constant-stride memory access along schedule dimension I and some unspecified memory dimension.

In other embodiments, new Boolean decision variables $q_{I,r}^{S,A}$ are introduced for each tuple (S, A, I, r) consisting of a statement S, an array A accessed by that statement, a possible schedule depth I for S and a possible memory dimensions r for A. Each decision variable encodes whether all the references to A within S have constant-stride memory access along schedule dimension I and the fixed memory dimension r.

In further embodiments, the vector decision variables $\Sigma_l^S$ are linked to the $p_l^{S,A}$ decision variables and the $p_l^{S,A}$ decision variables are linked to the $q_{l,r}^{S,A}$ decision variables through the following linear constraints:

$$\forall S \in \mathcal{G}, \forall l \in [1, d^S] \qquad K_1^S \cdot \sum_l^S \le \sum_{A \in S} p_l^{S,A}$$

$$\forall S \in \mathcal{G}, \forall l \in [1, d^S], \forall A \in S \qquad p_l^{S,A} \le \sum_{r=1}^{dimA} q_{l,r}^{S,A}$$

$$\forall S \in \mathcal{G}, \forall l \in [1, d^S], \forall A \in S, \quad K_3^{S,A} \cdot q_{l,r}^{S,A} \le \sum_{F \, acc. \, A} c_{l,r}^F$$
$$F \text{ accesses } A$$

Where $K_l^S$ is a static constant quantity determining the number of different arrays accessed by S and $K_3^{S,A}$ is the number of distinct references to array A within statement S.

In further embodiment, our innovation is exemplified by the code snippet below when only allowing vectorization along the innermost schedule dimension. The code on the left is the result of an optimization when allowing constant strided access only on the innermost memory dimension with schedules (i,j,k) and (j,k,i) respectively. The code on the right is the result of an optimization when allowing constant strided access on multiple memory dimensions with schedules (j,k,i) and (k,i,j) respectively. The code on the right exhibits more parallelism and vectorization by virtue of the doall k loop on the second statement which accesses array B.

```
for (i=2; i<=N+1; i++) {          for (i=2; i<=M+1; i++) {
  for (j=2; j<=M+1; j++) {          for (j=2; j<=N+1; j++) {
    doall (k=1; k<=L; k++) {          doall (k=1; k<=L; k++) {
      A[i][j][k]=A[i][j-1][k]+          A[j][i][k]=A[j][i-1][k]+
      A[i-i][j][k];                     A[j-1][i][k];
}}}                               }}}
for (i=2; i<=M+1; i++) {          for (i=1; i<=L; i++) {
  for (j=1; j<=L; j++) {            for j=2; j<=N+1; j++) {
    for (k=2; k<=N+1; k++) {          doall (k=2; k<=M+1; k++) {
      B[k][i][j+1]=A[k][i][j]+          B[j][k][i+1]=A[j][k][i]+
      B[k][i][j];                       B[j][k][i];
}}}                               }}}
```

Putting it all Together

In further embodiments of our invention, the expression of data layout transformations is at the granularity of a statement in the program and further data transformations are performed. The code on the right in the previous example is an illustration of this phenomenon: the second and third data dimensions of arrays A and B should be permuted between the 2 loop nests in order to achieve innermost constant-stride access (of stride 1 for both arrays).

In some embodiments, a global cost function for the program may be derived $$\max \sum_{S \in \mathcal{G}} \left( \sum_{k=1}^{d^S} w_k \Delta_k + \sum_{\substack{T \in \mathcal{G} \\ T \ne S}} \sum_{k=1}^{m(d^S, d^T)} f_k^T \Phi_k^T + \sum_{R \in S} \rho_{d^R}^R \cdot c_{d^r}^R + \sum_{k=1}^{d^S} \sigma_k \cdot \sum_k \right)$$

Where, for each statement S, $\Delta_k$, $\Phi_k^T$, $c_d^R$, $\Sigma_k$ are Boolean decision variables to express parallelism along schedule dimension k, locality along schedule dimension k, constant stride memory access along schedule dimension d and memory dimension r, vectorization along schedule dimension k, respectively. Correspondingly, for each statement S, $w_k$, $f_k^T$, $\rho_{d^R}^R$, $\sigma_k$ are coefficients that determine the benefits of parallelism along schedule dimension k, locality along schedule dimension k, constant stride memory access along schedule dimension d and memory dimension r, vectorization along schedule dimension k, respectively.

In further embodiments, the relative value of the costs $w_k$, $f_k^T$, $\rho_{d^R}^R$, $\sigma_k$ is determined by using static properties of the program such as estimated number of computations and arithmetic intensity to memory footprint ratio for different statements in the program. In other embodiments, the costs are also dependent on the level of the machine hierarchy for which scheduling is performed.

Embodiments of the present invention provide a custom computing apparatus, illustrated in FIG. 1, that is configured to optimize computer source code for operation on a second computing apparatus. As illustrated, first custom computing apparatus 10(a) is configured to communicate with second computing apparatus 10(b) across network 20. A further illustration of computing apparatus 10 is provided in FIG. 1. In this illustration custom computing apparatus 10(a) contains at least one processor 30 (a-n), a communication port 40 communicating with the at least one processor 30 (a-n). Custom computing apparatus 10(a) additionally includes memory 50, which in some embodiments includes dependence analysis module 220. Custom computing apparatus 10(a), in some embodiments, additionally includes drive 70 configured to accept external storage medium 80. In some embodiments, external storage medium 80 is a CD, in others a DVD. In these embodiments, drive 70 is configured to accept the appropriate external storage medium 80. While CD and DVD are specifically enumerated in these embodiments, there are many external storage media that can be used to practice various aspects of the invention therefore some embodiments are not limited to the particular drive 70 configuration or external media 80. Custom computing apparatus 10(a) additionally includes storage medium 60. Storage medium 60 in some embodiments is a hard-disk drive, and in others is a solid state drive. In some embodiments, storage medium 60 contains a set of processor executable instructions that when executed by the at least one processor 30(a-n) configure custom computing apparatus 10(a) to optimize computer code for execution on computing apparatus 10(b). While custom computing apparatus 10(a) and computing apparatus 10(b) are illustrated in FIG. 1 communicating over network 20, various embodiments of the invention do not require this inter-computer communication.

Figure 2:
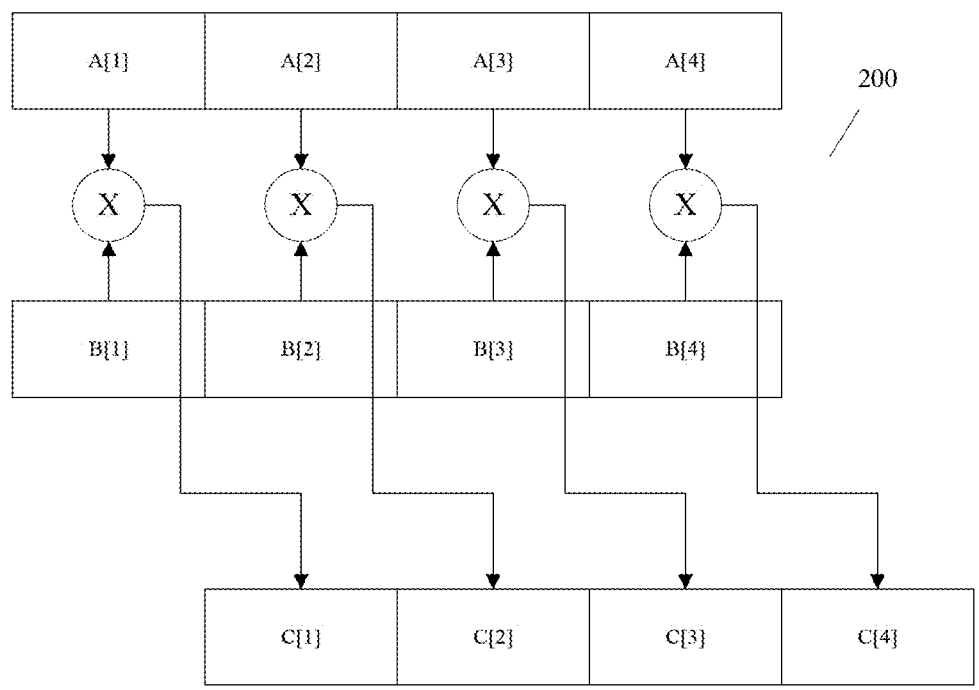
FIG. 2 illustrates an exemplary vector processing unit, according to a provided embodiment.

In some embodiments, the second computing apparatus 10(b) includes a vector unit/processor and a memory unit. The vector unit/processor may be a multi-stage vector execution unit. In addition, the second computing apparatus 10(b) may include one or more non-vector execution units that may execute at least portions of the program concurrently. FIG. 2 illustrates a vector execution unit 200 also referred to as SIMD (Single Instruction Multiple Data). The operands in registers A and B correspond to data spaced in memory with a uniform increment of one. Several execution units included in the vector execution unit 200 operate in parallel and, in a single operation, perform several computations "X" on each piece of data and store the corresponding results in a register C. The operations performed in a single step by the unit are: C[1]=A[1] "X" B[1], C[2]=A[2] "X" B[2], C[3]=A[3] "X" B[3] and C[4]=A[4] "X" B[4]. It should be understood that a vector unit having four parallel execution units is illustrative only, and that vector units having fewer or more parallel execution units are within the scope of the invention.

These operations are semantically legal if they can be executed in parallel. The selective tradeoff described below may identify such operations in the source code. In addition, when the data operands in memory are also spaced with a uniform increment, loading of the data from the memory to the registers requires less overhead. The selective tradeoff described below may also identify any data layout transformations required so that the data operands in memory are spaced evenly. The selective tradeoff may also take into account the penalty of performing such transformations. Accordingly, the selective tradeoff facilitates both aspects of vector execution unit utilization: parallelism and short uniform increments.

Figure 3:
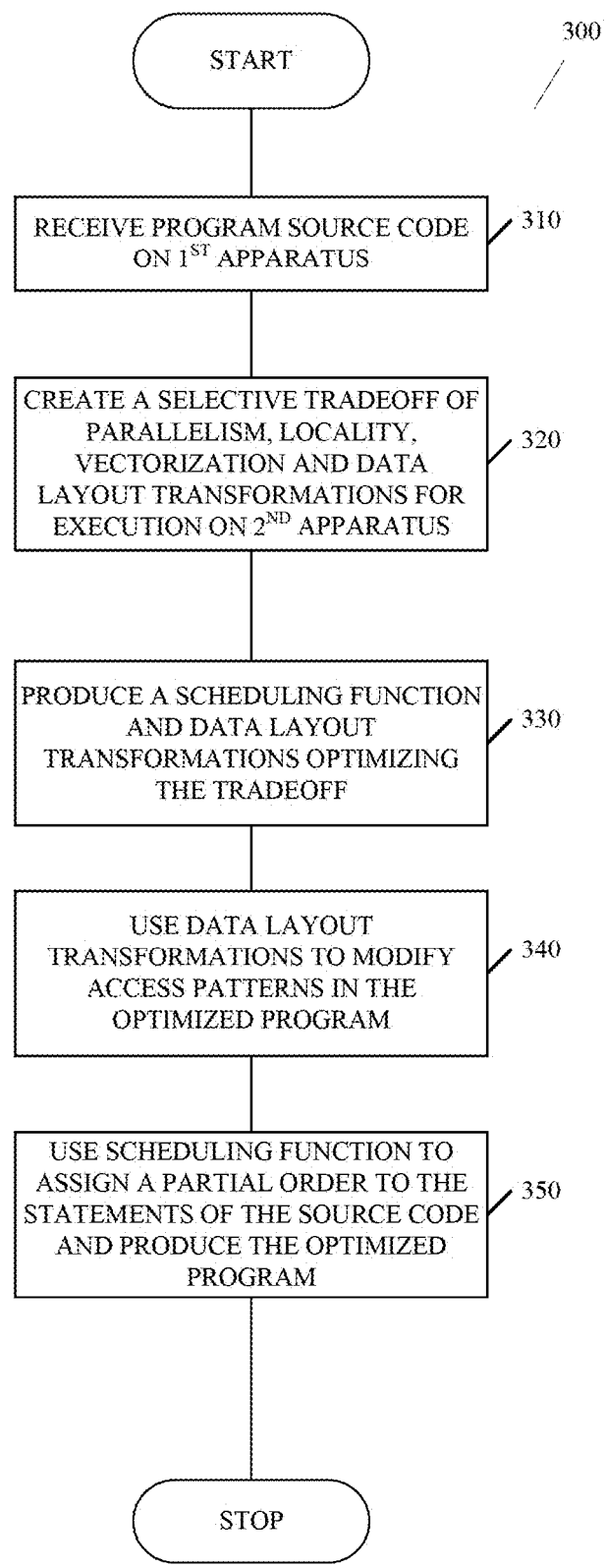
FIG. 3 illustrates an embodiment of a provided method

Turning now to FIG. 3 where the flow of provided method 300 of source code optimization is illustrated. Flow begins in block 310 where source code is received in memory 50 on a custom first computing apparatus 10(a). Flow continues to block 320 where a selective tradeoff of parallelism, locality, vectorization, and data layout transformations is created for execution of the code on the second computing apparatus 10(b). Flow then continues to block 330 where a scheduling function and data layout transformations are produced at least one of which optimizes the selective tradeoff. Flow continues to block 340 where the data layout transformations may be used to modify memory access patterns in the optimized program. Flow then continues to block 350 where the scheduling function is used to assign a partial order to the statements of the source code and an optimized program is produced for execution on the second computing apparatus 10(b). In one embodiment, the received program code contains at least one loop nest. As previously discussed the custom first computing apparatus 10(a) contains memory 50, a storage medium 60 and at least one processor with a multi-stage execution unit.

Figure 4:
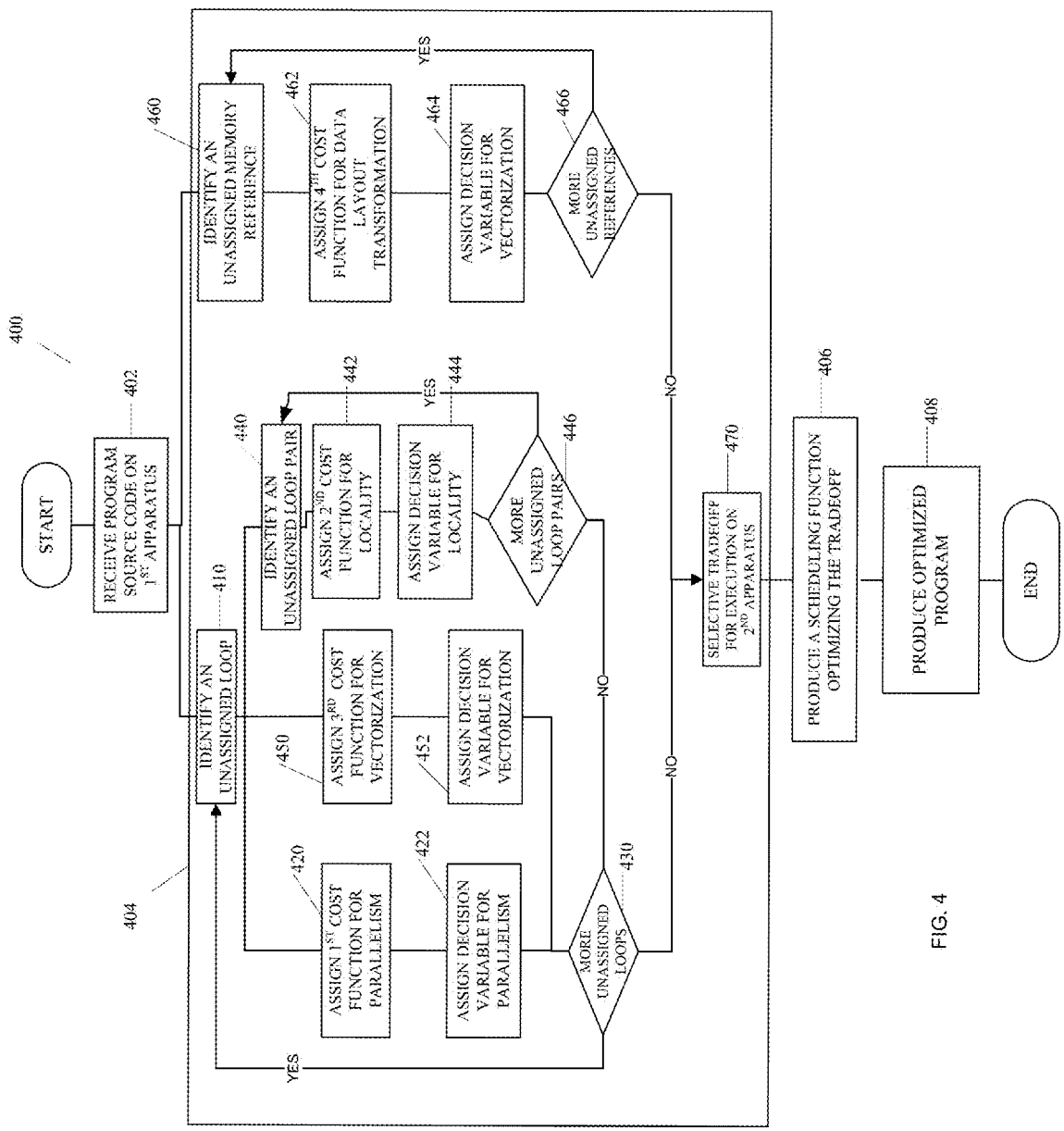
FIG. 4 illustrates an embodiment of a provided method.

An exemplary provided method 400 for source code optimization is illustrated in FIG. 4. In this embodiment, flow begins in block 402 where source code is received in memory 50 on a custom first computing apparatus 10(a). Flow continues to block 404 where the code is optimized in terms of parallelism, locality, vectorization, and data layout transformations, for execution on a second computing apparatus 10(b). In this embodiment, the optimization block 404 includes various functional blocks. Within block 404 flow continues on two paths, one starting with block 410 and the other starting with block 460. In block 410 an unassigned loop is identified. Flow then continues on three subpaths. In a first subpath flow continues to block 420 where a first cost function is assigned in block 420. This first cost function is related to a difference in execution speed between parallel and sequential operations of the statements within the loop on second computing apparatus 10(b). Flow then continues to block 422 where a decision variable is assigned to the loop under consideration, this decision variable indicating whether the loop is to be executed in parallel in the optimized program. In some embodiments the cost is determined through static evaluation of a model of the execution cost of the instructions in the loop under consideration. In other embodiments, the cost is determined through a dynamic execution on the second computing apparatus of at least a set of instructions representative of the code in the loop under consideration. In a further embodiment, the cost is determined by an iterative refining process consisting of at least one static evaluation of a model of the execution cost and at least one dynamic execution on the second computing apparatus of at least a set of instructions representative of the code in the loop under consideration. Flow then continues to decision block 430 where it is determined if there are additional unassigned loops.

As used herein, "executed together" generally means fused. Specifically executed together means that loops that are consecutive in the original program become interleaved in the optimized program. In particular, loops that are not "executed together" in the sense of loop fusion can be executed together on the same processor in the more general sense. In the second optimization subpath illustrated in FIG. 4 flow continues from block 410 to block 440 where an unassigned loop pair is identified. Flow then continues to block 442 where a second cost function is assigned for locality optimization. This second cost function is related to a difference in execution speed between operations where the loops in the pair of loops are executed together on the second computing apparatus, and where the loops in the pair of loops are not executed together on the second computing apparatus. Flow then continues to block 444 where a decision variable is assigned for locality. This second decision variable specifies if the loops in the loop pair under consideration are to be executed together in the optimized program.

In one embodiment, the second cost is determined through static evaluation of a model of the execution cost of the instructions in the at least one loop pair. In another embodiment, the second cost is determined through of a dynamic execution on the second computing apparatus of at least a set of instructions representative of the code in the at least one loop pair. In a further embodiment, the cost is determined through an iterative refining process consisting of at least one static evaluation of a model of the execution cost and at least one dynamic execution on the second computing apparatus of at least a set of instructions representative of the code in the at least one loop pair. Flow then continues to decision block 446 where it is determined if additional unassigned loop pairs exist. If additional unassigned loop pairs exist, flow continues back to block 440 and the process iterates until no additional unassigned loop pairs are found. When decision block 446 determines no additional loop pairs are present, flow continues to decision block 430.

In the third optimization subpath illustrated in FIG. 4, flow continues from block 410 to block 450 where a third cost function is assigned for exploring vectorization. This third cost function is related to a difference in execution speed between operations where the operations in the loop under consideration are executed using the vector unit/processor of the second computing apparatus, and where those operations are not executed using the vector unit/processor. Flow then continues to block 452 where a decision variable is assigned for vectorization. This third decision variable specifies if the operations of the loop under consideration are to be executed using the vector unit/processor of the second computing apparatus in the optimized program.

In one embodiment, the third cost is determined through static evaluation of a model of the execution cost of the instructions in the loop under consideration. In another embodiment, the third cost is determined through a dynamic execution on the second computing apparatus of at least a set of instructions representative of the code in the loop under consideration. In a further embodiment, the cost is determined through an iterative refining process including at least one static evaluation of a model of the execution cost and at least one dynamic execution on the second computing apparatus, as described above. Flow then continues to decision block 430.

If in decision block 430 it is determined that additional unassigned loops exist, flow continues back to block 410 and the process iterates until no additional unassigned loops may be identified. Flow then continues to block 470 explained in detail below.

In the second optimization path illustrated in FIG. 4, flow continues from block 402 to block 460 where an unassigned memory reference is identified. Flow then continues to block 462 where a fourth cost function is assigned for data layout transformations. This fourth cost function is related to a difference in execution speed between operations where the memory is accessed contiguously on the second computing apparatus, and where the memory is not accessed contiguously on the second computing apparatus. The fourth cost may also include the cost related to the penalty of performing a data layout transformation on at least one memory reference. Flow then continues to block 464 where a decision variable is assigned for data layout transformation. This fourth decision variable specifies if a memory reference under consideration is to be reordered in the optimized program.

In one embodiment, the fourth cost is determined through static evaluation of a model of the execution cost of the instructions in the program. In another embodiment, the fourth cost is determined through of a dynamic execution on the second computing apparatus of at least a set of instructions representative of the code in the program. In a further embodiment, the cost is determined through an iterative refining process consisting of at least one static evaluation of a model of the execution cost and at least one dynamic execution on the second computing apparatus of at least a set of instructions representative of the code in the program to be optimized. Flow then continues to decision block 466 where it is determined if additional unassigned memory references exist. If additional unassigned memory references exist, flow continues back to block 460 and the process iterates until no additional unassigned memory references are found. When decision block 466 determines that no additional memory references are present, flow continues to block 470.

In block 470, a selective tradeoff is created for parallelism, locality, vectorization, and data layout transformations during the execution on second computing apparatus 10(*b*). Flow then continues to block 406 where a scheduling function is produced that optimizes the selective tradeoff. Flow then continues to block 408 where optimized code is produced.

Figure 5:
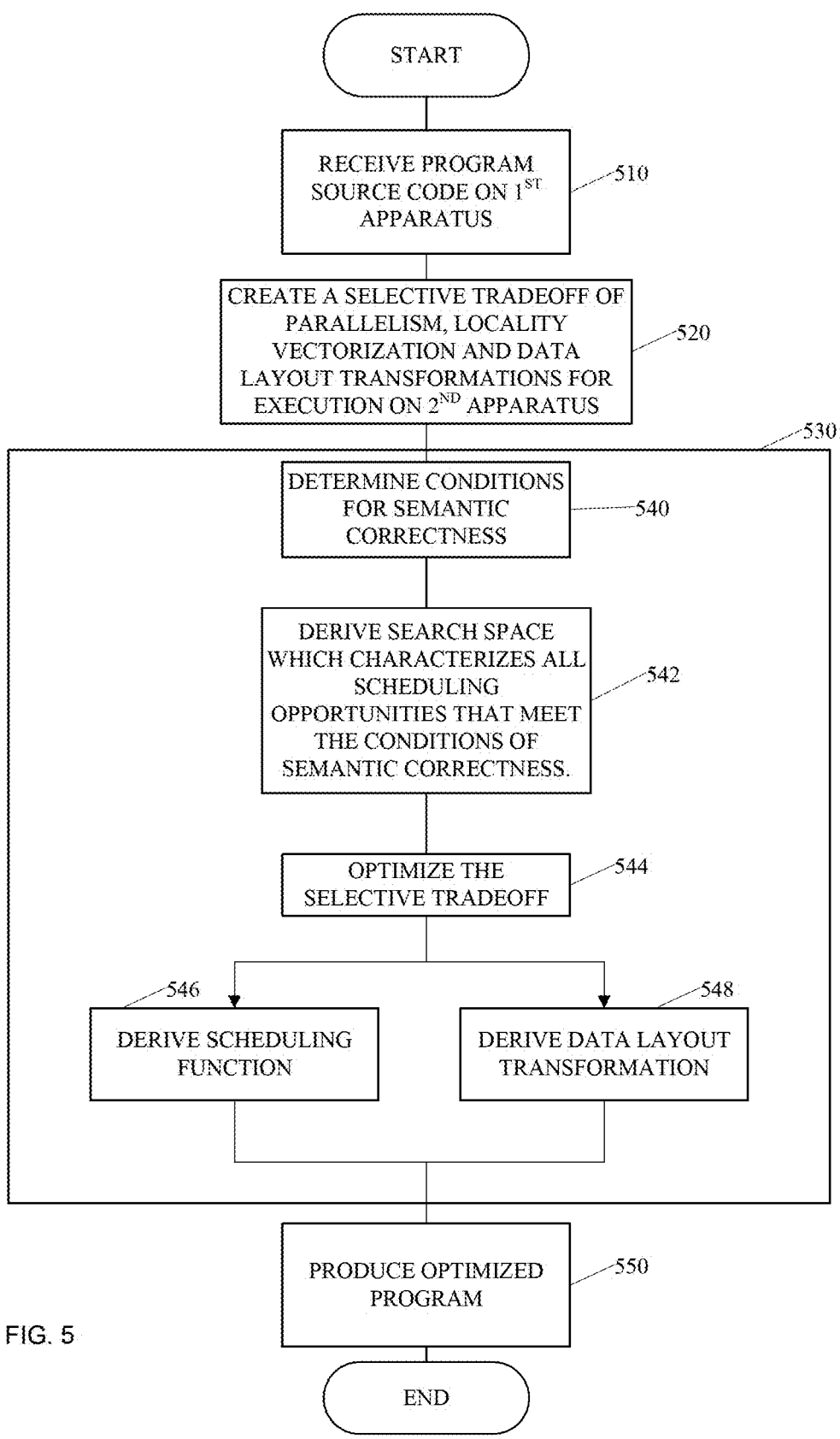
FIG. 5 illustrates an embodiment of a provided method.

The flow of a further provided embodiment of a method 500 for source code optimization is illustrated in FIG. 5. In this embodiment, flow begins in block 510 where source code is received in memory 50 on a custom first computing apparatus 10(*a*). Flow continues to block 520 where a selective tradeoff in terms of parallelism, locality, vectorization, and data layout transformations is created, for execution of optimized code on a second computing apparatus 10(*b*). Flow then continues to block 530 where a scheduling function and data layout transformations are produced that optimize the tradeoff. In this embodiment, the block 530 includes various functional blocks. Within block 530 flow continues to block 540 where the conditions for semantic correctness of the program are determined. Flow then continues to block 542 where a search space is derived that meet the conditions for semantic correctness. In one embodiment, the search space characterizes all parallelism and locality opportunities that meet the conditions of semantic correctness. Flow then continues to block 544 where the selective tradeoff is optimized. Flow then continues to block 546 where the scheduling function is derived from the optimized tradeoff. Flow also continues to block 548 where at least one data layout transformation is derived. Flow then continues to block 550 where optimized code is produced.

Figure 6:
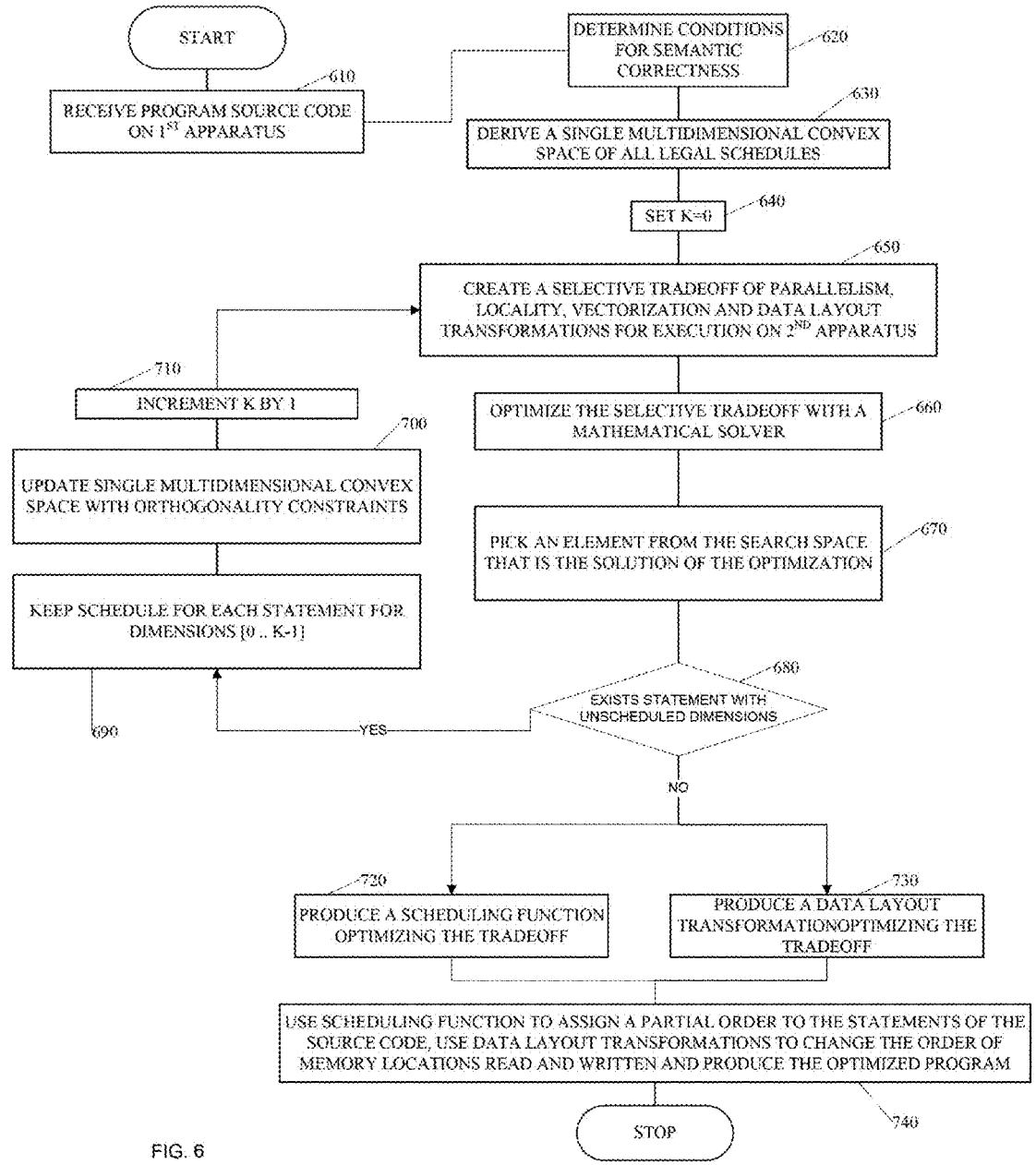
FIG. 6 illustrates an embodiment of a provided method.

The flow of a further provided embodiment of a method 600 for source code optimization is illustrated in FIG. 6. In this embodiment, flow begins in block 610 where source code of the program to be optimized is received in memory 50 on a custom first computing apparatus 10(*a*). Flow continues to block 620 conditions for semantic correctness of the program are determined. In block 630, a single multidimensional convex space of all legal schedule sis derived. This can be achieved by eliminating those schedules that violate any conditions determined in the block 620.

Flow continues to block 640 where a schedule dimension to be explored, k, is initialized to zero. In block 650, a selective tradeoff in terms of parallelism, locality, vectorization, and data layout transformations is created, for execution of optimized code on a second computing apparatus 10(*b*). That tradeoff is optimized using a mathematical solver (e.g., an integer linear programming solver) in block 660. Flow then continues to block 670 where an element from the search space is selected, the selected element being the solution of the optimization in block 660.

Flow then continues to a decision block 680, and if at least one program statement having an unscheduled dimension is determined to exists, flow continues to block 690. Otherwise, flow continues along two paths to blocks 720, 730, as described below. In block 690, schedules of the schedule dimensions that have been explored already are preserved for each program statement. Flow continues to block 700 where the single multidimensional convex space is updated with orthogonality constraints. These constraints, also called linear independent constraints, may be derived in this block. The schedule dimension is incremented by one in block 710, and flow continues to block 650 so as to allow exploration of the next schedule dimensions.

If the decision block 680 determines that there is no program statement with at least one unscheduled dimension, the flow continues to block 720 where a scheduling function optimizing the tradeoff is produced. In addition, in block 730, at least one data layout transformation optimizing the tradeoff is also produced. Flow then continues to block 740 where the scheduling function produced in block 720 is used to assign at least a partial order to the statements of the source code. The data layout transformations produced in block 730 are used to change the order of memory locations read and written from a memory on the second computing apparatus, and an optimized program is produced.

Thus, it is seen that methods and an apparatus for optimizing source code on a custom first computing apparatus for execution on a second computing apparatus are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, transformations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of scheduling operations of a program on a multi-execution unit computing apparatus, the method comprising:

receiving in memory on a first computing apparatus, a computer program comprising a set of operations, the first computing apparatus comprising the memory and a processor;

transforming the computer program for execution on a second computing apparatus, the second computing apparatus comprising at least one vector execution unit, the transformation comprising:

optimizing a selective tradeoff of a cost of parallelism, locality, vectorization and data-layout transformations to orchestrate computations associated with the program, the selective tradeoff comprising trading off a penalty for performing a data-layout transformation so as to adjust a spacing between memory access with a performance improvement due to vectorization corresponding to the data-layout transformation; and producing an optimized computer program for execution on the second computing apparatus, wherein the step of optimizing the selective tradeoff comprises:

determining an optimization problem representing: (i) each statement in a set of statements in the program, at least one statement in the set being associated with a multi-dimensional memory reference; (ii) a set of candidate schedules, each candidate schedule representing at least a partial order of execution of operations in the program on the second computing apparatus, and (iii) a set of aggregate costs, each aggregate cost being a cost of execution according to a corresponding candidate schedule, the aggregate cost comprising a parallelism cost and a locality cost, and at least one of a vectorization cost and a data-layout transformation cost; and optimizing the problem by selecting at least one of a loop transformation and a data-layout transformation to obtain a final schedule, such that the aggregate cost associated with the final schedule is minimized; and identifying at least one of the selected loop transformation and the selected data-layout transformation.

2. The method of claim 1, wherein the identified data-layout transformation corresponds to any one dimension of the multi-dimensional memory reference.

3. The method of claim 1, wherein the aggregate cost corresponding to a candidate schedule in the set of candidate schedules is based on, at least in part, a static evaluation of a model of cost of executing operations of the at least one statement according to the candidate schedule.

4. The method of claim 1, wherein the aggregate cost corresponding to a candidate schedule in the set of candidate schedules is based on, at least in part, a dynamic evaluation of a model of cost of executing operations of the at least one statement according to the candidate schedule, the dynamic evaluation being based on, at least in part, the second computing apparatus.

5. The method of claim 4 further comprising iteratively refining the aggregate cost using at least one of a static evaluation of a model of cost of executing operations of the at least one statement according to the candidate schedule and the dynamic evaluation.

6. The method of claim 1 further comprising determining a search space to be used in the step of optimizing the optimization problem, wherein at least one candidate schedule in the set of candidate schedules is selected by traversing the search space.

7. The method of claim 6, wherein the traversing step comprises exhaustively traversing the search space.

8. The method of claim 6, wherein the set of candidate schedules comprises each schedule in the search space.

9. The method of claim 1, wherein the set of operations comprises at least one loop nest.

10. The method of claim 9, wherein:

the transformation further comprises receiving a first schedule dimension within a plurality of schedule dimensions associated with the loop nest; and the optimizing step comprises solving, by a solver, the optimization problem to obtain the final schedule, wherein the final schedule corresponds to the first schedule dimension.

11. The method of claim 10, wherein the first schedule dimension corresponds to any linear combination of any loops in the loop nest.

12. The method of claim 10 further comprising:

receiving a second schedule dimension within the plurality of schedule dimensions associated with the loop nest;

adding schedule orthogonality constraints based on the first schedule dimension; and repeating the solving and identifying steps based on the second schedule dimension such that at least one of a loop transformation and a data-layout transformation associated with the final schedule corresponds to the first or second schedule dimensions.

13. The method of claim 9, wherein the optimizing step comprises computing a difference between: (a) speed of sequentially executing operations of a loop in the loop nest on a single execution unit in the second computing apparatus and (b) speed of executing those operations in parallel on a plurality of execution units in the second computing apparatus.

14. The method of claim 9, wherein:

the loop nest comprises first and second loops; and the optimizing step comprises computing a difference between: (a) speed of alternately executing an operation of the first loop and an operation of the second loop and (b) speed of executing all operations of the first loop followed by executing all operations of the second loop.

15. The method of claim 1, wherein:

the optimizing step comprises computing a difference between: (a) speed of executing operations of the at least one statement associated with the multi-dimensional memory reference such that a plurality of memory locations associated with the memory reference are accessed according to a uniform spacing between successive accesses and (b) speed of executing those operations such that the plurality of memory locations accessed are spaced apart nonuniformly.

16. The method of claim 1, wherein:
the penalty for performing a data-layout transformation so as to adjust a spacing between memory access comprises a penalty associated with multi-dimensional memory reference.

17. The method of claim 1, wherein the optimizing step comprises assigning a decision variable corresponding to at least one of parallelism, locality, vectorization, and data-layout transformations.

18. The method of claim 17, wherein the set of operations comprises at least one loop nest, and the decision variable specifies at least one of:
(i) if a loop in the loop nest is to be executed in parallel by the second computing apparatus;
(ii) if a pair of loops in the loop nest are to be executed together by the second computing apparatus;
(iii) if a loop in the loop nest is to be executed as a vector loop; and
(iv) if a memory reference associated with a loop within the loop nest requires a data-layout transformation allowing for vector access to the memory reference during execution of operations of the loop.

19. The method of claim 18, wherein the optimizing step comprises optimizing a global weighted parametric function of: (i) the parallelism cost, (ii) the locality cost, (iii) the vectorization cost, (iv) the data-layout transformations cost, and (v) four decision variables.

20. The method of claim 1 further comprising identifying, by the at least one processor in the first computing apparatus and a dependence analysis module, a plurality of schedules of operations in the set of operations, at least one of the identified schedules improving at least one of parallelism, locality, vectorization, and contiguity of memory accesses of the at least some of the operations.

21. The method of claim 20 further comprising determining a set of conditions preserving semantic correctness of the program if the at least some of the operations are executed according to one of the schedules in the plurality of schedules.

22. The method of claim 21 further comprising eliminating from the plurality of schedules each schedule violating at least one condition, so as to obtain a search space to be used in the step of optimizing the selective tradeoff.

23. A custom computing apparatus comprising:
at least one processor;
a memory coupled to the at least one processor; and
a storage medium coupled to the memory and the at least one processor the storage medium comprising a set of processor executable instructions sufficient that when executed by the at least one processor configure the custom computing apparatus to optimize a computer program for execution on a second computing apparatus, the computer program comprising a set of operations, the second computing apparatus comprising at least one vector execution unit, the configuration comprising a configuration to:
receive a computer program in the memory;
transform the computer program for execution on the second computing apparatus, the transformation comprising optimization of a selective tradeoff of a cost of parallelism, locality, vectorization and data-layout transformations to orchestrate computations associated with the program, the selective tradeoff comprising trading off a penalty for performing a data-layout transformation so as to adjust a spacing between memory access with a performance improvement due to vectorization corresponding to the data-layout transformation; and
produce an optimized computer program for execution on the second computing apparatus, wherein the optimization of the selective tradeoff comprises:
determination of an optimization problem representing:
(i) each statement in a set of statements in the program, at least one statement in the set being associated with a multi-dimensional memory reference; (ii) a set of candidate schedules, each candidate schedule representing at least a partial order of execution of operations in the program on the second computing apparatus, and (iii) a set of aggregate costs, each aggregate cost being a cost of execution according to a corresponding candidate schedule, the aggregate cost comprising a parallelism cost and a locality cost, and at least one of a vectorization cost and a data-layout transformation cost; and
optimization of the problem by selecting at least one of a loop transformation and a data-layout transformation to obtain a final schedule, such that the aggregate cost associated with the final schedule is minimized; and
identification of at least one of the selected loop transformation and the selected data-layout transformation.

24. The custom computing apparatus of claim 23, wherein the identified data-layout transformation corresponds to any one dimension of the multi-dimensional memory reference.

25. The custom computing apparatus of claim 23, wherein the aggregate cost corresponding to a candidate schedule in the set of candidate schedules is based on, at least in part, a static evaluation of a model of cost of executing operations of the at least one statement according to the candidate schedule.

26. The custom computing apparatus of claim 23, wherein the aggregate cost corresponding to a candidate schedule in the set of candidate schedules is based on, at least in part, a dynamic evaluation of a model of cost of executing operations of the at least one statement according to the candidate schedule, the dynamic evaluation being based on, at least in part, the second computing apparatus.

27. The custom computing apparatus of claim 26, wherein the configuration further configures the custom computing apparatus to iteratively refine the aggregate cost using at least one of a static evaluation of a model of cost of executing operations of the at least one statement according to the candidate schedule and the dynamic evaluation.

28. The custom computing apparatus of claim 23, wherein the configuration further configures the custom computing apparatus to determine a search space to be used in the optimization of the optimization problem, wherein at least one candidate schedule in the set of candidate schedules is selected by traversing the search space.

29. The custom computing apparatus of claim 28, wherein the configuration further configures the custom computing apparatus to traverse exhaustively the search space.

30. The custom computing apparatus of claim 28, wherein the set of candidate schedules comprises each schedule in the search space.

31. The custom computing apparatus of claim 23, wherein the set of operations comprises at least one loop nest.

32. The custom computing apparatus of claim 31, wherein:

the transformation further comprises receiving a first schedule dimension within a plurality of schedule dimensions associated with the loop nest; and the configuration for optimization comprises a further configuration for solving the optimization problem to obtain the final schedule, wherein the final schedule corresponds to the first schedule dimension.

33. The custom computing apparatus of claim 32, wherein the first schedule dimension corresponds to any linear combination of any loops in the loop nest.

34. The custom computing apparatus of claim 32, wherein the configuration further configures the custom computing apparatus to:

receive a second schedule dimension within the plurality of schedule dimensions associated with the loop nest;

add schedule orthogonality constraints based on the first schedule dimension; and repeat the optimization by solving and identification based on the second schedule dimension such that at least one of a loop transformation and a data-layout transformation associated with the final schedule corresponds to the first or second schedule dimensions.

35. The custom computing apparatus of claim 31, wherein the optimization comprises computing a difference between: (a) speed of sequentially executing operations of a loop in the loop nest on a single execution unit in the second computing apparatus and (b) speed of executing those operations in parallel on a plurality of execution units in the second computing apparatus.

36. The custom computing apparatus of claim 31, wherein:

the loop nest comprises first and second loops; and the optimization comprises computing a difference between: (a) speed of alternately executing an operation of the first loop and an operation of the second loop and (b) speed of executing all operations of the first loop followed by executing all operations of the second loop.

37. The custom computing apparatus of claim 23, wherein:

the optimization comprises computing a difference between: (a) speed of executing operations of the at least one statement associated with the multi-dimensional memory reference such that a plurality of memory locations associated with the memory reference are accessed according to a uniform spacing between successive accesses and (b) speed of executing those operations such that the plurality of memory locations accessed are spaced apart nonuniformly.

38. The custom computing apparatus of claim 23, wherein:

the penalty for performing a data-layout transformation so as to adjust a spacing between memory access comprises a penalty associated with multi-dimensional memory reference.

39. The custom computing apparatus of claim 23, wherein the optimization comprises assigning a decision variable corresponding to at least one of parallelism, locality, vectorization, and data-layout transformations.

40. The custom computing apparatus of claim 39, wherein the set of operations comprises at least one loop nest, and the decision variable specifies at least one of:

(i) if a loop in the loop nest is to be executed in parallel by the second computing apparatus;

(ii) if a pair of loops in the loop nest are to be executed together by the second computing apparatus;

(iii) if a loop in the loop nest is to be executed as a vector loop; and (iv) if a memory reference associated with a loop within the loop nest requires a data-layout transformation allowing for vector access to the memory reference during execution of operations of the loop.

41. The custom computing apparatus of claim 40, wherein the optimization comprises optimizing a global weighted parametric function of: (i) the parallelism cost, (ii) the locality cost, (iii) the vectorization cost, (iv) the data-layout transformations cost, and (v) four decision variables.

42. The custom computing apparatus of claim 23, wherein the configuration further configures the custom computing apparatus to identify, a plurality of schedules of operations in the set of operations, at least one of the identified schedules improving at least one of parallelism, locality, vectorization, and contiguity of memory accesses of the at least some of the operations.

43. The custom computing apparatus of claim 42, wherein the configuration further configures the custom computing apparatus to determine a set of conditions preserving semantic correctness of the program if the at least some of the operations are executed according to one of the schedules in the plurality of schedules.

44. The custom computing apparatus of claim 43, wherein the configuration further configures the custom computing apparatus to eliminate from the plurality of schedules each schedule violating at least one condition, so as to obtain a search space to be used in the optimization of the selective tradeoff.

45. An article of manufacture, comprising a non-transitory machine-readable medium storing instructions that, when executed by a machine, configure the machine to:

receive a computer program in the memory;

transform the computer program for execution on the second computing apparatus, the transformation comprising optimization of a selective tradeoff of a cost of parallelism, locality, vectorization and data-layout transformations to orchestrate computations associated with the program, the selective tradeoff comprising trading off a penalty for performing a data-layout transformation so as to adjust a spacing between memory access with a performance improvement due to vectorization corresponding to the data-layout transformation; and produce an optimized computer program for execution on the second computing apparatus, wherein the optimization of the selective tradeoff comprises:

determination of an optimization problem representing:
(i) each statement in a set of statements in the program, at least one statement in the set being associated with a multi-dimensional memory reference; (ii) a set of candidate schedules, each candidate schedule representing at least a partial order of execution of operations in the program on the second computing apparatus, and (iii) a set of aggregate costs, each aggregate cost being a cost of execution according to a corresponding candidate schedule, the aggregate cost comprising a parallelism cost and a locality cost, and at least one of a vectorization cost and a data-layout transformation cost; and optimization of the problem by selecting at least one of a loop transformation and a data-layout transformation to obtain a final schedule, such that the aggregate cost associated with the final schedule is minimized; and identification of at least one of the selected loop transformation and the selected data-layout transformation.

46. The article of claim 45, wherein the identified data-layout transformation corresponds to any one dimension of the multi-dimensional memory reference.

47. The article of claim 45, wherein the aggregate cost corresponding to a candidate schedule in the set of candidate schedules is based on, at least in part, a static evaluation of a model of cost of executing operations of the at least one statement according to the candidate schedule.

48. The article of claim 45, wherein the aggregate cost corresponding to a candidate schedule in the set of candidate schedules is based on, at least in part, a dynamic evaluation of a model of cost of executing operations of the at least one statement according to the candidate schedule, the dynamic evaluation being based on, at least in part, the second computing apparatus.

49. The article of claim 48, wherein the configuration further configures the machine to iteratively refine the aggregate cost using at least one of a static evaluation of a model of cost of executing operations of the at least one statement according to the candidate schedule and the dynamic evaluation.

50. The article of claim 45, wherein the configuration further configures the machine to determine a search space to be used in the optimization of the optimization problem, wherein at least one candidate schedule in the set of candidate schedules is selected by traversing the search space.

51. The article of claim 50, wherein the configuration further configures the machine to traverse exhaustively the search space.

52. The article of claim 50, wherein the set of candidate schedules comprises each schedule in the search space.

53. The article of claim 45, wherein the set of operations comprises at least one loop nest.

54. The article of claim 53, wherein:
the transformation further comprises receiving a first schedule dimension within a plurality of schedule dimensions associated with the loop nest; and
the configuration for optimization comprises a further configuration for solving the optimization problem to obtain the final schedule, wherein the final schedule corresponds to the first schedule dimension.

55. The article of claim 54, wherein the first schedule dimension corresponds to any linear combination of any loops in the loop nest.

56. The article of claim 54, wherein the configuration further configures the machine to:
receive a second schedule dimension within the plurality of schedule dimensions associated with the loop nest;
add schedule orthogonality constraints based on the first schedule dimension; and
repeat the optimization by solving and identification based on the second schedule dimension such that at least one of a loop transformation and a data-layout transformation associated with the final schedule corresponds to the first or second schedule dimensions.

57. The article of claim 53, wherein the optimization comprises computing a difference between: (a) speed of sequentially executing operations of a loop in the loop nest on a single execution unit in the second computing apparatus and (b) speed of executing those operations in parallel on a plurality of execution units in the second computing apparatus.

58. The article of claim 53, wherein:
the loop nest comprises first and second loops; and
the optimization comprises computing a difference between: (a) speed of alternately executing an operation of the first loop and an operation of the second loop and (b) speed of executing all operations of the first loop followed by executing all operations of the second loop.

59. The article of claim 45, wherein:
the optimization comprises computing a difference between: (a) speed of executing operations of the at least one statement associated with the multi-dimensional memory reference such that a plurality of memory locations associated with the memory reference are accessed according to a uniform spacing between successive accesses and (b) speed of executing those operations such that the plurality of memory locations accessed are spaced apart nonuniformly.

60. The article of claim 45, wherein:
the penalty for performing a data-layout transformation so as to adjust a spacing between memory access comprises a penalty associated with multi-dimensional memory reference.

61. The article of claim 45, wherein the optimization comprises assigning a decision variable corresponding to at least one of parallelism, locality, vectorization, and data-layout transformations.

62. The article of claim 61, wherein the set of operations comprises at least one loop nest, and the decision variable specifies at least one of:
(i) if a loop in the loop nest is to be executed in parallel by the second computing apparatus;
(ii) if a pair of loops in the loop nest are to be executed together by the second computing apparatus;
(iii) if a loop in the loop nest is to be executed as a vector loop; and
(iv) if a memory reference associated with a loop within the loop nest requires a data-layout transformation allowing for vector access to the memory reference during execution of operations of the loop.

63. The article of claim 62, wherein the optimization comprises optimizing a global weighted parametric function of: (i) the parallelism cost, (ii) the locality cost, (iii) the vectorization cost, (iv) the data-layout transformations cost, and (v) four decision variables.

64. The article of claim 45, wherein the configuration further configures the machine to identify, a plurality of schedules of operations in the set of operations, at least one of the identified schedules improving at least one of parallelism, locality, vectorization, and contiguity of memory accesses of the at least some of the operations.

65. The article of claim 64, wherein the configuration further configures the machine to determine a set of conditions preserving semantic correctness of the program if the at least some of the operations are executed according to one of the schedules in the plurality of schedules.

66. The article of claim 65, wherein the configuration further configures the machine to eliminate from the plurality of schedules each schedule violating at least one condition, so as to obtain an search space to be used in the optimization of the selective tradeoff.

* * * * *